US007526785B1

(12) United States Patent
Pearson et al.

(10) Patent No.: US 7,526,785 B1
(45) Date of Patent: Apr. 28, 2009

(54) TRUSTED COMPUTING PLATFORM FOR RESTRICTING USE OF DATA

(75) Inventors: Siani Lynne Pearson, Bristol (GB); Liqun Chen, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 841 days.

(21) Appl. No.: 10/088,258

(22) PCT Filed: Sep. 25, 2000

(86) PCT No.: PCT/GB00/03689

§ 371 (c)(1),
(2), (4) Date: Mar. 13, 2002

(87) PCT Pub. No.: WO01/23980

PCT Pub. Date: Apr. 5, 2001

(30) Foreign Application Priority Data

Sep. 25, 1999 (GB) ................................. 9922665.6

(51) Int. Cl.
*H04N 7/167* (2006.01)
(52) U.S. Cl. ..................................................... 725/31
(58) Field of Classification Search .................... 725/31
See application file for complete search history.

(56) References Cited

U.S. PATENT DOCUMENTS

| | | | | |
|---|---|---|---|---|
| 4,562,306 | A | | 12/1985 | Chou et al. ............... 178/22.08 |
| 4,918,653 | A | | 4/1990 | Johri et al. .................... 726/23 |
| 5,008,936 | A | * | 4/1991 | Hamilton et al. ............ 380/281 |
| 5,355,414 | A | * | 10/1994 | Hale et al. ..................... 726/34 |
| 5,359,659 | A | | 10/1994 | Rosenthal ..................... 726/24 |
| 5,361,359 | A | | 11/1994 | Tajalli et al. ................ 395/700 |
| 5,390,297 | A | | 2/1995 | Barber et al. .................. 726/29 |
| 5,406,624 | A | * | 4/1995 | Tulpan ....................... 713/192 |
| 5,473,692 | A | | 12/1995 | Davis .......................... 705/59 |
| 5,517,569 | A | * | 5/1996 | Clark .......................... 380/52 |
| 5,533,126 | A | * | 7/1996 | Hazard ....................... 713/187 |
| 5,680,547 | A | | 10/1997 | Chang .................... 395/200.01 |
| 5,825,879 | A | * | 10/1998 | Davis .......................... 380/216 |
| 5,870,723 | A | | 2/1999 | Pare et al. ..................... 705/39 |
| 5,903,732 | A | | 5/1999 | Reed et al. ............. 395/200.59 |
| 5,933,498 | A | | 8/1999 | Schneck et al. ................. 380/4 |
| 5,937,159 | A | | 8/1999 | Meyers et al. ................. 726/20 |
| 5,943,423 | A | | 8/1999 | Muftic ........................ 705/67 |
| 5,990,927 | A | * | 11/1999 | Hendricks et al. ........... 725/132 |
| 5,991,399 | A | | 11/1999 | Graunke et al. ............. 380/279 |
| 6,006,332 | A | | 12/1999 | Rabne et al. ................ 713/201 |
| 6,023,765 | A | | 2/2000 | Kuhn ......................... 713/200 |
| 6,028,933 | A | * | 2/2000 | Heer et al. .................. 713/169 |
| 6,091,835 | A | | 7/2000 | Smithies et al. ............. 382/115 |
| 6,092,147 | A | | 7/2000 | Levy et al. ..................... 711/6 |
| 6,092,202 | A | | 7/2000 | Veil et al. .................... 713/201 |
| 6,157,719 | A | * | 12/2000 | Wasilewski et al. ......... 380/210 |
| 6,219,788 | B1 | * | 4/2001 | Flavin et al. ................ 713/194 |
| 6,236,971 | B1 | * | 5/2001 | Stefik et al. .................... 705/1 |
| 6,246,767 | B1 | * | 6/2001 | Akins et al. ................. 380/210 |
| 6,266,416 | B1 | | 7/2001 | Sigbjørnsen et al. ........ 380/255 |
| 6,289,462 | B1 | | 9/2001 | McNabb et al. ............. 713/201 |
| 6,307,939 | B1 | * | 10/2001 | Vigarie ....................... 380/210 |
| 6,327,652 | B1 | | 12/2001 | England et al. ................ 713/2 |
| 6,330,670 | B1 | | 12/2001 | England et al. ................ 713/2 |
| 6,343,280 | B2 | | 1/2002 | Clark .......................... 705/55 |
| 6,363,488 | B1 | | 3/2002 | Ginter et al. ................... 726/1 |
| 6,378,072 | B1 | | 4/2002 | Collins et al. ............... 713/187 |
| 6,463,474 | B1 | | 10/2002 | Fuh et al. .................... 709/225 |
| 6,477,648 | B1 | | 11/2002 | Schell et al. .................. 726/22 |
| 6,499,110 | B1 | | 12/2002 | Moses et al. ................... 726/1 |
| 6,510,513 | B1 | | 1/2003 | Danieli ....................... 713/156 |
| 6,609,199 | B1 | | 8/2003 | DeTreville .................. 713/187 |
| 6,697,948 | B1 | | 2/2004 | Rabin et al. ................... 726/30 |
| 6,775,779 | B1 | | 8/2004 | England et al. ............... 726/26 |

(Continued)

FOREIGN PATENT DOCUMENTS

EP    0 421 409 A2    4/1991

(Continued)

OTHER PUBLICATIONS

Schneck, P.B., "Persistent Access Control to Prevent Piracy of Digital Information," *Proceedings of the IEEE*, vol. 87, No. 7, pp. 1239-1250 (Jul. 1999).

(Continued)

*Primary Examiner*—Jacob Lipman
(74) *Attorney, Agent, or Firm*—Richard A. Lawrence

(57) ABSTRACT

A client/server system has a client platform adapted to provide restricted use of data provided by a serve. The client platform comprises a display, secure communications means, and a memory containing image receiving code for receiving data from a server by the secure communication means and for display of such data. The client platform is adapted such that the data received from a server is used for display of the data and not for an unauthorised purpose. A server adapted to provide data to a client platform for restricted use by the client platform comprises a memory containing image sending code for providing an image of data executed on the server, and secure communications means for secure communication of images of data to a client platform. The server is adapted to determine that a client platform is adapted to ensure restricted use of the data before it is sent by the image sending code.

20 Claims, 9 Drawing Sheets

U.S. PATENT DOCUMENTS

| | | | |
|---|---|---|---|
| 6,820,063 B1 | 11/2004 | England et al. | 705/54 |
| 6,857,067 B2 | 2/2005 | Edelman | 713/155 |
| 7,124,938 B1 | 10/2006 | Marsh | 235/382 |
| 2002/0012432 A1 | 1/2002 | England et al. | 380/231 |
| 2002/0019934 A1 | 2/2002 | Ishizaku | |
| 2003/0005289 A1 | 1/2003 | Gougeon et al. | 713/156 |
| 2003/0056054 A1 | 3/2003 | Levy et al. | 711/6 |
| 2003/0196085 A1 | 10/2003 | Lampson et al. | 713/156 |
| 2003/0196119 A1 | 10/2003 | Raley et al. | 726/30 |

FOREIGN PATENT DOCUMENTS

| | | |
|---|---|---|
| EP | 0 580 350 A1 | 1/1994 |
| EP | 0 684 538 A1 | 11/1995 |
| EP | 0 717 337 A1 | 6/1996 |
| EP | 0 849 657 A1 | 6/1998 |
| EP | 0 895 148 A1 | 2/1999 |
| EP | 1 041 481 A2 | 10/2000 |
| EP | 1 076 279 A1 | 2/2001 |
| EP | 1 081 891 A2 | 3/2001 |
| GB | 2 267 631 A | 12/1993 |
| GB | 2 317 476 A | 3/1998 |
| GB | 2 365 160 A | 2/2002 |
| GB | 2 372 343 A | 8/2002 |
| GB | 2 372 594 A | 8/2002 |
| GB | 2 372 595 A | 8/2002 |
| JP | 10-333902 | 12/1998 |
| JP | 2001 148037 | 11/1999 |
| WO | 93/24906 | 12/1993 |
| WO | 95/27249 | 10/1995 |
| WO | 95/33239 A1 | 12/1995 |
| WO | 98/36517 | 8/1998 |
| WO | 98/44402 | 10/1998 |
| WO | WO 9844402 A1 * | 10/1998 |
| WO | 00/31644 | 6/2000 |
| WO | 00/45241 A2 | 8/2000 |
| WO | 00/48063 | 8/2000 |
| WO | 00/58859 | 10/2000 |
| WO | 01/01224 A1 | 1/2001 |
| WO | 01/27722 A1 | 4/2001 |
| WO | 01/46876 | 6/2001 |
| WO | 01/65366 A1 | 9/2001 |
| WO | 01/95071 A2 | 12/2001 |

OTHER PUBLICATIONS

Information technology-Security techniques-Entity Authentication—Part 3: Mechanisms using digital signature techniques, *ISO/IEC 9798-3*, 6 pages (1998).

"Information technology-Security techniques-Key management—Part 3: Mechanisms using asymmetric techniques," *ISO/IEC 11770-3*, pp. 1-23 and Annexes A-E (1999).

The Trusted Computing Platform Alliance, "Building a Foundation of Trust in the PC," 9 pages, located at Internet address <www.trustedpc.org/home/home.html> (Jan. 2000).

Trusted Computing Platform Alliance, Main Specification Version 1.0, 284 pages (Jan. 25, 2001).

Neuman, B.C., et al., "Kerberos: An Authentication Service for Computer Networks," *IEEE Communications Magazine*, pp. 33-38 (Sep. 1994).

Yee, B., "Using Secure Coprocessors," Doctoral thesis—Carnegie Mellon University, pp. 1-94 (May 1994).

*Trusted Computing Platform Alliance (TCPA), Main Specification*, Version 1.0, pp. 1-284 (2000).

Ashley, P., et al., "Using SESAME to Implement Role Based Access Control in Unix File Systems," *Proceedings IEEE*, pp. 141-146 (Jun. 8, 1999).

U.S. Appl. No. 10/049,211, filed Feb. 5, 2002, Pearson et al.
U.S. Appl. No. 10/049,213, filed Feb. 5, 2002, Pearson et al.
U.S. Appl. No. 10/296,557, filed Nov. 22, 2002, Proudler.
U.S. Appl. No. 10/643,306, filed Aug. 18, 2003, Proudler.

* cited by examiner

LOGICAL DIAGRAM OF IMAGE TRANSFER SYSTEM

TRUSTED COMPUTING PLATFORM FOR RESTRICTING USE OF DATA

CROSS REFERENCE TO RELATED APPLICATIONS

The subject matter of the present application may also be related to the following U.S. patent applications: "Computer Platforms and their Methods of Operation," Ser. No. 10/049,211, filed Feb. 5, 2002; "Enforcing Restrictions on the Use of Stored Data," Ser. No. 10/049,213, filed Feb. 5, 2002; "An Information Security System," Ser. No. 10/296,557, filed Nov. 22, 2002; and "A Method of Controlling the Processing of Data," Ser. No. 10/643,306, filed Aug. 18, 2003.

FIELD OF INVENTION

The invention relates to provision of trusted terminal functionality in a client/server system. The invention is relevant to provision of content to a user, or trialling of software by a user, without risk to the content or software owner that the content or software will be misused.

DESCRIPTION OF PRIOR ART

In this specification, 'data' signifies anything that can be formatted digitally, such as images, software and streaming media.

In the future, computer systems will be able to achieve a more secure booting, together with integrity checks on other code to ensure that viruses or other unauthorised modifications have not been made to the operating systems and mounted software. In addition, a new generation of tamper-proof devices are already appearing or will soon appear on the market and include both external or portable modules (such as smart cards) and internal modules (embedded processors, semi-embedded processors or co-processors with security functionality, i.e. including motherboard, USB (Universal Serial Bus) and ISA (Industry Standard Architecture) implementations). These tamper-proof modules will be used to check that the hardware of the system has not been tampered with, and to provide a more reliable form of machine identity than currently available (for example, the Ethernet name). Despite this, counteraction of data piracy, and licensing and metering use of software in a manner that is acceptable to both software developers and end-users is still a significant problem.

Software licensing is subject to hackers and piracy, and all the current software licensing methods used have problems associated with them. Software implementations of licensing (such as "licence management systems") are flexible, but not especially secure or fast. In particular, they suffer from a lack of security (for example, being subject to a generic "hack") and difficulty in genuine replacement of software. Conversely, hardware implementations ("dongles") are faster and generally more secure than software implementations, but inflexible. They are tailored only for a particular piece of software and are inconvenient for end-users.

Prior art in the field of content protection includes techniques such as watermarking of content, software wrappers around content, protecting passwords and fingerprinting techniques. In addition, there are various approaches that involve encryption of content that is sent to the client machine, and a decryption key being sent to the client machine in order that it can decrypt the content. All these approaches suffer from the potential drawback that the client machine could be untrustworthy, and that the data could be abused once decrypted or otherwise made available to the client machine (for example, by the protection mechanism being hacked, or by the clear version being copied).

SUMMARY OF THE INVENTION

In a first aspect of the invention, there is provided a client platform adapted to provide restricted use of data provided by a server, the client platform comprising: a display; secure communications means; and a memory containing image receiving code for receiving data from a server by the secure communication means and for display of such data; wherein the client platform is adapted such that the data received from a server is used for display of the data and not for an unauthorised purpose.

In a second aspect of the invention there is provided a server adapted to provide data to a client platform for restricted use by the client platform, comprising: a memory containing image sending code for providing an image of data executed on the server; and secure communications means for secure communication of images of data to a client platform, whereby the server is adapted to determine that a client platform is adapted to ensure restricted use of the data before it is sent by the image sending code. In a third aspect the invention provides a system for providing image data securely to a user for restricted use, comprising a client platform as described above and a server as described above, wherein a user on the client platform requests image data from the server to view at the client platform.

In a fourth aspect the invention provides a method of providing image data to a client platform for restricted use, comprising a client platform requesting image data from a server, the server determining that the client platform both has permission to receive image data, and is adapted to use the image data only for the restricted use, and provision of the image data over a secure communication channel.

Preferred embodiments of the invention provide enforced trusted terminal functionality in a full function platform—this enables the display of data processed remotely, while preventing the misuse of that data. Benefits can be obtained for client, server, or developer, as the system can be used for a wide range of services, including protection of private information, licensing of data, or allowing trial software to have full functionality without risk of copying or misuse. These benefits arise because the client platform can be trusted to output data faithfully, in such a way that the data itself cannot be copied or modified. Hence, for example, full functionality can be used for trial software, which is rarely the case at present because of the security risks involved. Advantages are also present for end users—one is that sensitive information such as e-mail messages need not be stored on the hard disk of the client machine, so in hot-desking situations (such as use of a shared terminal in a public place) such information can be effectively protected against attacks on its confidentiality or integrity.

The approach in embodiments of the present invention to conent protection differs from existing prior art models: here, at least part of the information is generally temporarily stored in protected memory either within, or only accessible by, tamper-resistant hardware before deletion, and this part is not stored on the hard disk. The tamper-resistant hardware is used for authentication, for controlling the output of the image and optionally for billing. The client machine never gets the whole data package (protected or unprotected), as it does in conventional models described, and so it is not possible to abuse the software via the client machine in ways to which prior art approaches are susceptible. Hence, for example, the user will be able to copy the screen or retype text from the screen, but will not be able to copy an original document; in the case of music, the user will be able to listen to a soundtrack and record the sound in the room, but will not be able to copy the digital object directly. This cuts down the attractiveness of piracy considerably.

In addition to the benefits of protection against copying and unauthorised use of data, and increased flexibility in licensing models such as pay-per-use and time-dependent models, embodiments of the invention offer protection against hacking attempts such as modification or deletion of data wrappers stored on the client platform, since such storage never takes place in this model and tamper-resistant hardware within the client platform protects against alteration of any image within the platform. More specifically, if data access is allowed to users on a trial basis, at present the danger of copying or modification of the usage controls upon such data is generally considered too large to allow anything but an inferior product to be sent for trial usage. Systems provided by embodiments of the present invention allow software with full functionality, or images with full resolution, to be examined by end-users.

Although systems according to embodiments of the present invention can be used for the purposes of software licensing, or provision of full functionality trial software as mentioned above, they can be used instead or in conjunction with these in order to also protect private information of the client. For example, if an end-user logs in to a shared terminal containing tamper-resistant hardware in order to access private information, possibly using remote login, then this information is only stored in protected memory either within or accessible only via the hardware and not on the hard disk, and can be deleted entirely after the user has logged out.

In preferred embodiments of the invention, client platform (and server) employ a tamper-proof component, or "trusted module" in conjunction with software, preferably running within the tamper-proof component, that controls manipulation of and selections relating to a data image to be transferred between the such computer platforms. The trusted module or modules have a significant role in ensuring that trusted terminal functionality is provided in a full function platform. Metering records can be stored in a tamper-proof device or smart card and reported back to administrators as required. There can be an associated clearinghouse mechanism to enable registration and payment for data.

The trusted module or component is preferably immune to unauthorised modification or inspection of internal data. It is physical to prevent forgery, tamper-resistant to prevent counterfeiting, and preferably has cryptographic functions to securely communicate at a distance. Methods of building trusted modules are, per se, well known to those skilled in the art. The trusted module may use cryptographic methods to give itself a cryptographic identity and to provide authenticity, integrity confidentiality, guard against replay attacks, make digital signatures, and use digital certificates as required. These and other cryptographic methods and their initialisation are well known to those skilled in the art of security.

In a particularly preferred arrangement, a licensing system employing embodiments of the present invention comprises at least two computer platforms, one acting as server and one as client, which are connected by a secure communications path. Each computer platform has: a trusted module which is resistant to internal tampering and which stores a third party's public key certificate; means of storing remote imaging code (in the case of the server, remote image sending code for providing an interface for sending information from the server to other trusted platforms corresponding to an image of data executing upon the server; in the case of the client, remote image receiving code for providing an interface for receiving information from other trusted platforms corresponding to an image of data which may be displayed upon the monitor of the client platform and/or capturing user selections relating to the running of such an image and relaying these back to the server platform); and means of storing a hashed version of the remote imaging code signed with the third party's private key; wherein the computer platform is programmed so that, upon booting of the platform, the remote imaging code is integrity checked with reference to the signed version and the public key certificate, and if the integrity check fails, the remote imaging code is prevented from being loaded. If the integrity check fails, it may be arranged that the complete platform integrity fails. Optionally, part of the functionality of the remote imaging code may be carried out by hardware within the local trusted component rather than by software. One or more smart cards, with an associated reader, are an additional, optional part of the computer platform—the smart cards may provide user (rather than platform) licenses to allow access to the image data.

It is possible for trusted terminal functionality to be employed in a number of different ways. The extreme form of the general model is that licensed data is executed on the server, and not on the client. In return for payment, the client receives imaging information corresponding to the execution of the data on the trusted server. This is sent via the remote image sending code on the server. Thereafter, the remote image receiving code on the client machine sends to the server keyboard strokes, corresponding to the selections of the user, and receives in return imaging information, corresponding to the changing execution of the application. The imaging information is sent directly from the trusted server via a secure channel such as PPTP to the trusted component within the client, which is adapted to display the imaging information directly without having to involve any untrusted parts of the computing apparatus.

There are other possibilities available as regards bow much software actually runs on the client. It is not efficient in all cases to run all software on the server rather than the client. For relatively sensitive information (this might apply for data access, or where there may be substantial overlap each time the software runs) it might be applicable to store temporarily all of the image in client protected memory, and have the software displayed on the client, but actually running on the server. The client at no stage stores the software apart from the image stored in the protected memory, and therefore is not liable to license infringement attacks on the data via the hard disk or other storage media. For less sensitive information, and especially where an application may produce differing images each time it is run, as is usually the case with game software, it would probably be more appropriate to run the software only partly from the server; for example, essentially running locally, but needing certain critical input from the server (such as an on-line service) in order to run the software. The server must still have overall control, so that although the client machine may be able to run the program, the run cannot succeed without the server being involved. There are different ways of carrying this out: for example, the server could supply key bits of the information, and transmit the image in communal blocks which would be the same for all clients, with the client trusted component repeatedly authenticating to the server trusted component for personalised information or key bits; or some of the data could be stored locally, with the server transmitting additional data to the protected memory. For the sake of efficiency, during and after execution, only part of the information (such as the key bits) is stored in the protected memory, and the rest can be stored on the hard disk or other storage media. This partial model of image transfer can be used concurrently with total models for different data on the same server.

The server is in a trusted environment, which is protected against data and wrappers being altered or copied. Hence, licensing models such as pay-per-use and time-dependent models, as well as more traditional models, may be used in a secure manner.

Preferably display processing is controlled from within the trusted component so that the display to the user cannot be subverted. In cases where a user smart card is required to obtain the image data, a seal image can be displayed on the client display which only the owner of the smart card inserted into the reader knows to be their correct seal image, in order to check the security of the connection between the client and server. Before the smart card owner carries out sensitive tasks such as providing billing information, the smart card may require authentication from the trusted component of the client platform (this authentication may be enhanced by the seal image being shown on the client monitor) and so require authorisation from the smart card owner before any sensitive information is conveyed.

As an option, the display of a selected area of pixels on the trusted client platform may be reserved for an alternative usage by the server trusted platform, perhaps on behalf of a third party. The given pixel area can vary over time, and convey information that may not directly be related to the data executing on the trusted server platform. This allows adverts or other proprietary information to be incorporated into the display image sent by the server trusted platform, or a trusted third party.

DESCRIPTION OF PREFERRED EMBODIMENT

Figure 1:
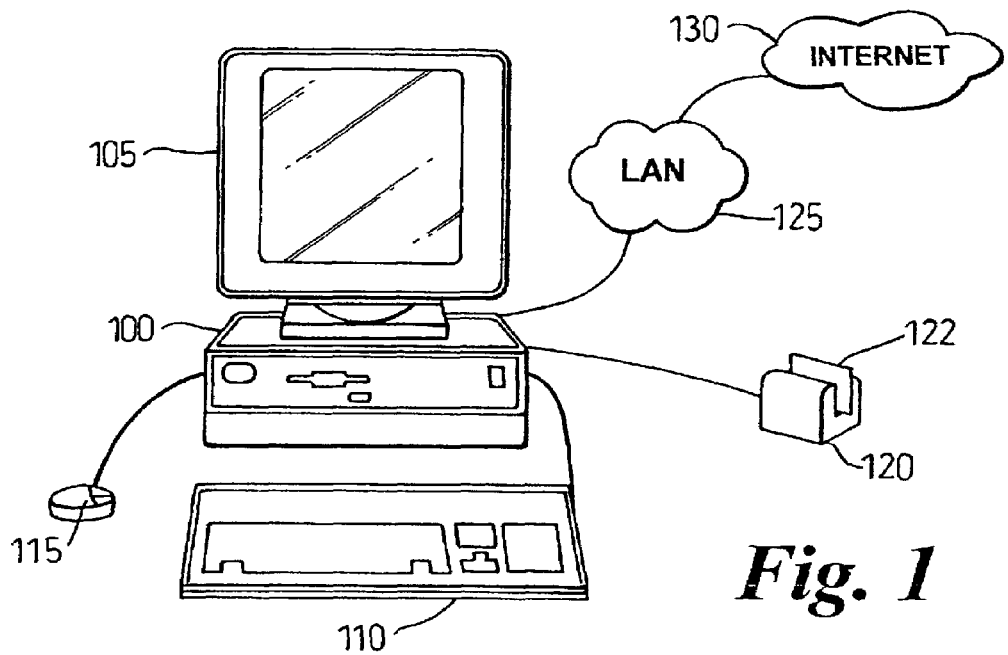
FIG. 1 shows elements of a host computer appropriate for use as a trusted client platform in embodiments of the invention.

An embodiment of the present invention will now be described, by way of example. A part of the system of this preferred embodiment is a client platform will be described which contains a trusted component, the trusted component allowing secure and reliable interaction with the client platform by users or other parties communicating with the client platform. Such a trusted component is described below, but is more fully described in the applicant's copending International Patent Application No. PCT/GB 00/00528 entitled "Trusted Computing Platform" filed on 15 Feb. 2000 and incorporated by reference herein. The trusted component in the client platform also controls the client platform display, so the user can be confident that what is seen on the display has not been subverted by an unauthorised process operating on the client platform. This aspect of the trusted component is also described below, but is more fully described in the applicant's copending International Patent Application No. PCT/GB 00/01996 entitled "System for Digitally Signing a Document" filed on 25 May 2000 and incorporated by reference herein. The system also employs in preferred embodiments a trusted token personal to a user—in the embodiment described in detail here, the trusted token is a user smart card. In addition, in the embodiment described, not only the client platform but also the server contains a trusted component (though this does need to have trusted display functionality).

Certain elements of the system—the trusted component, including trusted display functionality, and the user smart card—will now be described in detail with reference to FIGS. 1 to 9. The skilled person will appreciate that in the context of the present invention, the specific form of trusted computing platform (and trusted component), trusted display and smart card are not critical, and may be modified without departing from the scope of the invention as claimed.

To achieve a trusted computing platform, there is incorporated into the computing platform a physical trusted device whose function is to bind the identity of the platform to reliably measured data that provides an integrity metric of the platform. The trusted device may also (as is described below) act as a trusted display processor. The trusted display processor (or a device with similar properties) is associated with video data at a stage in the video processing beyond the point where data can be manipulated by standard host computer software. This allows the trusted display processor to display data on a display surface without interference or subversion by the host computer software. Thus, the trusted display processor can be certain what image is currently being displayed to the user. The identity and the integrity metric are compared with expected values provided by a trusted party (TP) that is prepared to vouch for the trustworthiness of the platform. If there is a match, the implication is that at least part of the platform is operating correctly, depending on the scope of the integrity metric.

A user verifies the correct operation of the platform before exchanging other data with the platform. A user does this by requesting the trusted device to provide its identity and an integrity metric. (Optionally the trusted device will refuse to provide evidence of identity if it itself was unable to verify correct operation of the platform.) The user receives the proof of identity and the identity metric, and compares them against values which it believes to be true. Those proper values are provided by the TP or another entity that is trusted by the user. If data reported by the trusted device is the same as that provided by the TP, the user trusts the platform. This is because the user trusts the entity. The entity trusts the platform because it has previously validated the identity and determined the proper integrity metric of the platform.

Once a user has established trusted operation of the platform, he exchanges other data with the platform. For a local user, the exchange might be by interacting with some software application running on the platform. For a remote user, the exchange might involve a secure transaction. In either case, the data exchanged is 'signed' by the trusted device. The user can then have greater confidence that data is being exchanged with a platform whose behaviour can be trusted.

The trusted device uses cryptographic processes but does not necessarily provide an external interface to those cryptographic processes. Also, a most desirable implementation would be to make the trusted device tamperproof, to protect secrets by making them inaccessible to other platform functions and provide an environment that is substantially immune to unauthorised modification. Since tamper-proofing is impossible, the best approximation is a trusted device that is tamper-resistant, or tamper-detecting. The trusted device, therefore, preferably consists of one physical component that is tamper-resistant.

Techniques relevant to tamper-resistance are well known to those skilled in the art of security. These techniques include methods for resisting tampering (such as appropriate encapsulation of the trusted device), methods for detecting tampering (such as detection of out of specification voltages, X-rays, or loss of physical integrity in the trusted device casing), and methods for eliminating data when tampering is detected. Further discussion of appropriate techniques can be found at http://www.cl.cam.ac.uk/~mgk25/tamper.html. It will be appreciated that, although tamper-proofing is a most desirable feature of the present invention, it does not enter into the normal operation of the invention and, as such, is beyond the scope of the present invention and will not be described in any detail herein.

The trusted device is preferably a physical one because it must be difficult to forge. It is most preferably tamper-resistant because it must be hard to counterfeit. It typically has an engine capable of using cryptographic processes because it is required to prove identity, both locally and at a distance, and it contains at least one method of measuring some integrity metric of the platform with which it is associated.

FIG. 1 illustrates a host computer system in which the host computer is (for example) a Personal Computer, or PC, which operates under the Windows NT™ operating system. According to FIG. 1, the host computer 100 is connected to a visual display unit (VDU) 105, a keyboard 110, a mouse 115 and a smartcard reader 120, and a local area network (LAN) 125, which in turn is connected to the Internet 130. Herein, the smartcard reader is an independent unit, although it may be an integral part of the keyboard. The VDU, keyboard, mouse, and trusted switch can be thought of as the human/computer interface (HCI) of the host computer. More specifically, the display, when operating under trusted control, as will be described, can be thought of as part of a 'trusted user interface'. FIG. 1 also illustrates a smartcard 122 for use in the present embodiment as will be described.

Figure 2:
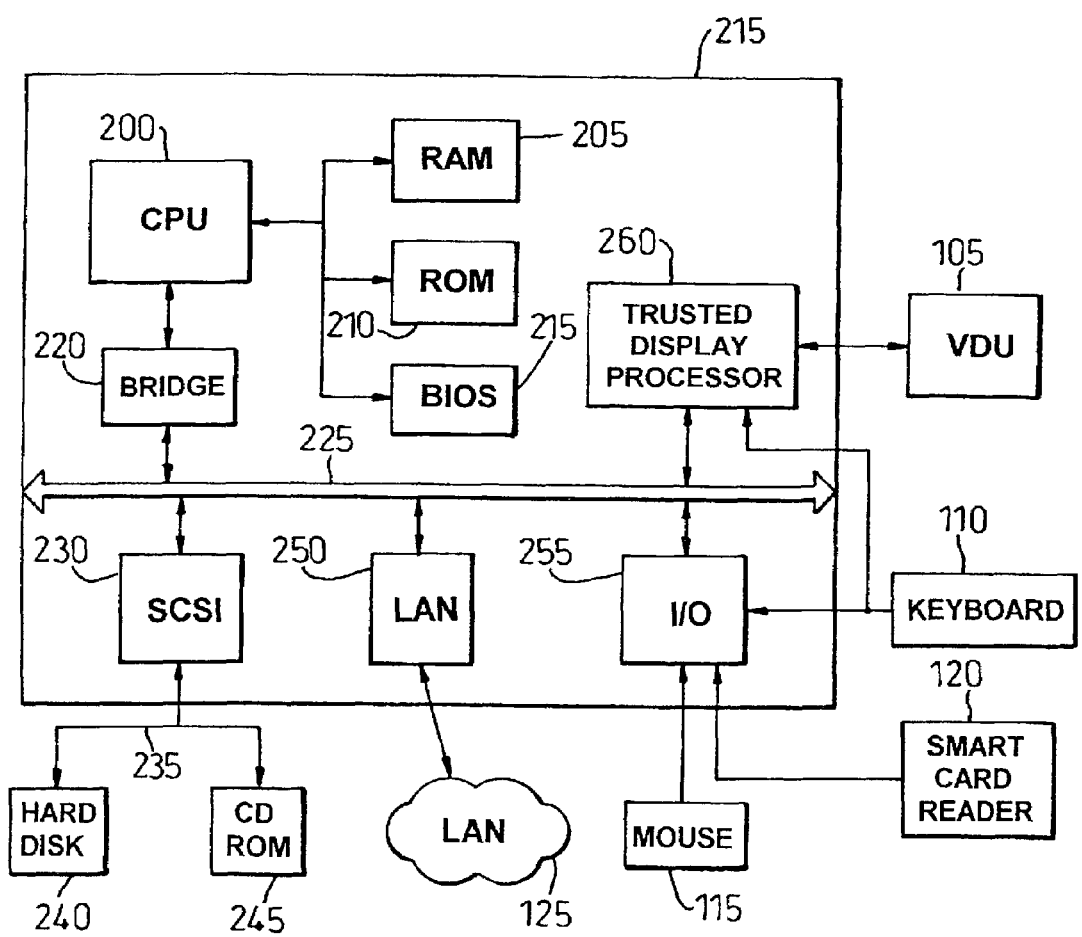
FIG. 2 shows the hardware architecture of the host computer of FIG. 1.

FIG. 2 shows a hardware architecture of the host computer of FIG. 1.

According to FIG. 2, the host computer 100 comprises a central processing unit (CPU) 200, or main processor, connected to main memory, which comprises RAM 205 and ROM 210, all of which are mounted on a motherboard 215 of the host computer 100. The CPU in this case is a Pentium™ processor. The CPU is connected via a PCI (Peripheral Component Interconnect) bridge 220 to a PCI bus 225, to which are attached the other main components of the host computer 100. The bus 225 comprises appropriate control, address and data portions, which will not be described in detail herein. For a detailed description of Pentium processors and PCI architectures, which is beyond the scope of the present description, the reader is referred to the book, "The Indispensable PC Hardware Handbook", 3rd Edition, by Hans-Peter Messmer, published by Addison-Wesley, ISBN 0-201-40399-4. Of course, the present embodiment is in no way limited to implementation using Pentium processors, Windows™ operating systems or PCI buses.

The other main components of the host computer 100 attached to the PCI bus 225 include: a SCSI (small computer system interface) adaptor connected via a SCSI bus 235 to a hard disk drive 240 and a CD-ROM drive 245; a LAN (local area network) adaptor 250 for connecting the host computer 100 to a LAN 125, via which the host computer 100 can communicate with other host computers (not shown), such as file servers, print servers or email servers, and the Internet 130; an IO (input/output) device 225, for attaching the keyboard 110, mouse 115 and smartcard reader 120; and a trusted device 260 (which incorporates the trusted display processor function). The trusted display processor handles all standard display functions plus a number of further tasks, which will be described in detail below. 'Standard display functions' are those functions that one would normally expect to find in any standard host computer 100, for example a PC operating under the Windows N™ operating system, for displaying an image associated with the operating system or application software.

All the main components, in particular the trusted device 260, are preferably also integrated onto the motherboard 215 of the host computer 100, although, sometimes, LAN adapters 250 and SCSI adapters 230 can be of the plugin type.

Typically, in a personal computer the BIOS program is located in a special reserved memory area 215, the upper 64K of the first megabyte of the system memory (addresses FØØØh to FFFFh), and the main processor is arranged to look at this memory location first, in accordance with an industry wide standard.

The significant difference between the platform and a conventional platform is that, after reset, the main processor is initially controlled by the trusted device, which then hands control over to the platform-specific BIOS program, which in turn initialises all input/output devices as normal. After the BIOS program has executed, control is handed over as normal by the BIOS program to an operating system program, such as Windows NT™, which is typically loaded into main memory from a hard disk drive.

Clearly, this change from the normal procedure requires a modification to the implementation of the industry standard, whereby the main processor 200 is directed to address the trusted component (also described as trusted device) 260 to receive its first instructions. This change may be made simply by hard-coding a different address into the main processor 200. Alternatively, the trusted device 260 may be assigned the standard BIOS program address, in which case there is no need to modify the main processor configuration.

It is highly desirable for the BIOS boot block to be contained within the trusted device 260. This prevents subversion of the obtaining of the integrity metric (which could otherwise occur if rogue software processes are present) and prevents rogue software processes creating a situation in which the BIOS (even if correct) fails to build the proper environment for the operating system.

Although, in the preferred form to be described, the trusted device 260 is a single, discrete component, it is envisaged that the functions of the trusted device 260 may alternatively be split into multiple devices on the motherboard, or even integrated into one or more of the existing standard devices of the platform. For example, it is feasible to integrate one or more of the functions of the trusted device into the main processor itself, provided that the functions and their communications cannot be subverted. This, however, would probably require separate leads on the processor for sole use by the trusted functions. Additionally or alternatively, although in the present embodiment the trusted device is a hardware device that is adapted for integration into the motherboard 215, it is anticipated that a trusted device may be implemented as a 'removable' device, such as a dongle, which could be attached to a platform when required. Whether the trusted device is integrated or removable is a matter of design choice. However, where the trusted device is separable, a mechanism for providing a logical binding between the trusted device and the platform should be present.

After system reset, the trusted device 260 performs a secure boot process to ensure that the operating system of the platform 100 (including the system clock and the display on the monitor) is running properly and in a secure manner. During the secure boot process, the trusted device 260 acquires an integrity metric of the computing platform 100. The trusted device 260 can also perform secure data transfer and, for example, authentication between it and a smart card via encryption/decryption and signature/verification. The trusted device 260 can also securely enforce various security control policies, such as locking of the user interface. Moreover, in this arrangement the trusted device 260 also acts as a trusted display processor, providing the standard display functions of a display processor and the extra, non-standard functions for providing a trusted user interface.

Figure 3:
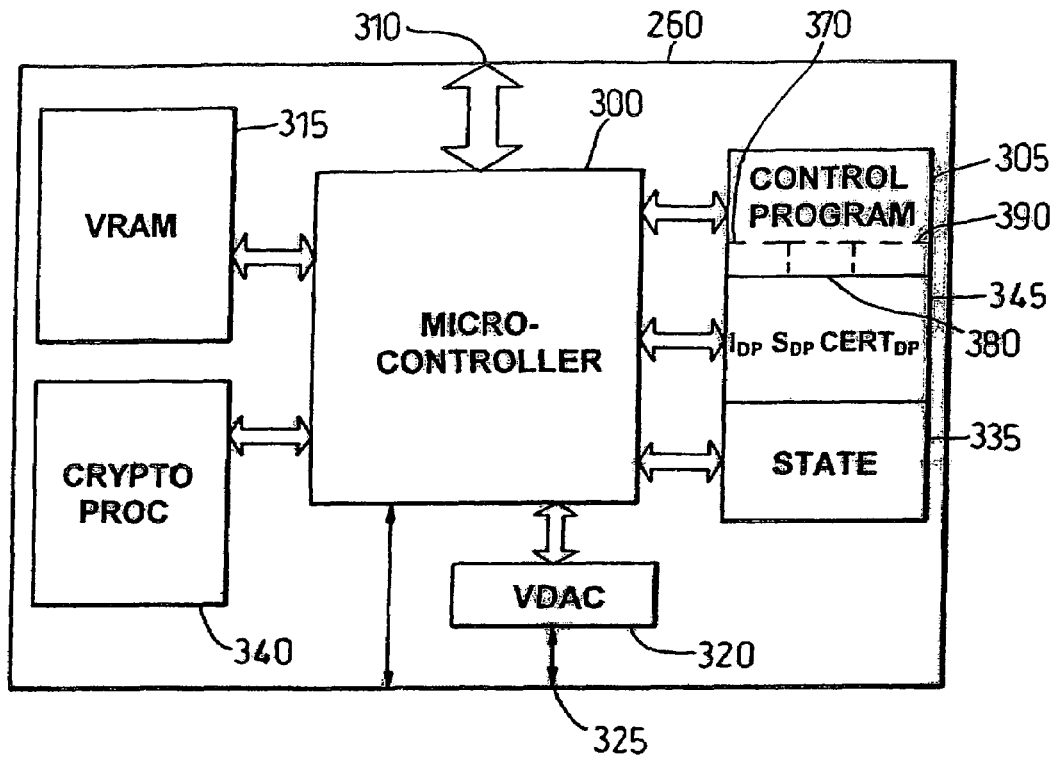
FIG. 3 shows the elements of a trusted device suitable for use in embodiments of the invention.

According to FIG. 3, the trusted device 260 comprises:

a controller 300;

non-volatile memory 305, for example flash memory, containing respective control program instructions (i.e. firmware) for controlling the operation of the microcontroller 300 (alternatively, the trusted device 260 could be embodied in an ASIC, which would typically provide greater performance and cost efficiency in mass production, but would generally be more expensive to develop and less flexible)—the control program includes a measurement function 370 for acquiring the integrity metric from the computing platform and an authentication function 380 for authenticating a smart card (or other trusted component);

an interface 310 for connecting the trusted device 260 to the PCI bus for receiving information including image data (i.e. graphics primitives) from the CPU 200 and also trusted image data from the smartcard 122, as will be described;

frame buffer memory 315, which comprises sufficient VRAM (video RAM) in which to store at least one full image frame (a typical frame buffer memory 315 is 1-2 Mbytes in size, for screen resolutions of 1280×768 supporting up to 16.7 million colours);

a video DAC (digital to analogue converter) 320 for converting pixmap data into analogue signals for driving the (analogue) VDU 105, which connects to the video DAC 320 via a video interface 325;

volatile memory 335, for example DRAM (dynamic RAM) or more expensive SRAM (static RAM), for storing state information, particularly received cryptographic keys, and for providing a work area for the microcontroller 300;

a cryptographic processor 340, comprising hardware cryptographic accelerators and/or software, arranged to provide the trusted device 260 with a cryptographic identity and to provide authenticity, integrity and confidentiality, guard against replay attacks, make digital signatures, and use digital certificates, as will be described in more detail below; and non-volatile memory 345, for example flash memory, for storing an identifier IDP of the trusted device 260 (for example a simple text string name—this can be used for indexing and labelling of data relevant to the trusted device, but is in itself insufficient to prove the identity of the platform under trusted conditions), a private key $S_{DP}$ of the trusted device 260, a certificate $Cert_{DP}$ signed and provided by a trusted third party certification agency (TP), such as VeriSign Inc., which binds the trusted device 260 with a signature public-private key pair and a confidentiality public-private key pair and includes the corresponding public keys of the trusted device 260.

A certificate typically contains such information, but not the public key of the CA. That public key is typically made available using a 'Public Key Infrastructure' (PKI). Operation of a PKI is well known to those skilled in the art of security.

The certificate $Cert_{DP}$ is used to supply the public key of the trusted device 260 to third parties in such a way that third parties are confident of the source of the public key and that the public key is a part of a valid public-private key pair. As such, it is unnecessary for a third party to have prior knowledge of, or to need to acquire, the public key of the trusted device 260.

The certificate $T_P$ (or, optionally, a further certificate) contains not only the public key of the trusted device 260 but also an authenticated value of the platform integrity metric measured by the trusted party (TP). In later communications sessions, a user of the platform 100 can verify the integrity of the platform 100 by comparing the acquired integrity metric with the authentic integrity metric in the certificate. If there is a match, the user can be confident that the platform 10 has not been subverted. Knowledge of the TP's generally-available public key enables simple verification of the certificate.

The trusted device 260 is equipped with at least one method of reliably measuring or acquiring the integrity metric of the computing platform 100 with which it is associated. In the present embodiment, the integrity metric is acquired by the measurement function 370 by generating a digest of the BIOS instructions in the BIOS memory Such an acquired integrity metric, if verified as described above, gives a potential user of the platform 100 a high level of confidence that the platform 100 has not been subverted at a hardware, or BIOS program, level. Other known processes, for example virus checkers, will typically be in place to check that the operating system and application program code has not been subverted.

The measurement function 370 has access to: non-volatile memory 305,345 for storing a hash program 390 and a private key SDP of the trusted device 260, and volatile memory 335 for storing acquired integrity metric in the form of a digest. In appropriate embodiments, the volatile memory 335 may also be used to store the public keys and associated ID labels of one or more authentic smart cards 122 that can be used to gain access to the platform 100.

In one preferred implementation, as well as the digest, the integrity metric includes a Boolean value, which is stored in volatile memory 335 by the measurement function 370, for reasons that will become apparent.

Figure 4:
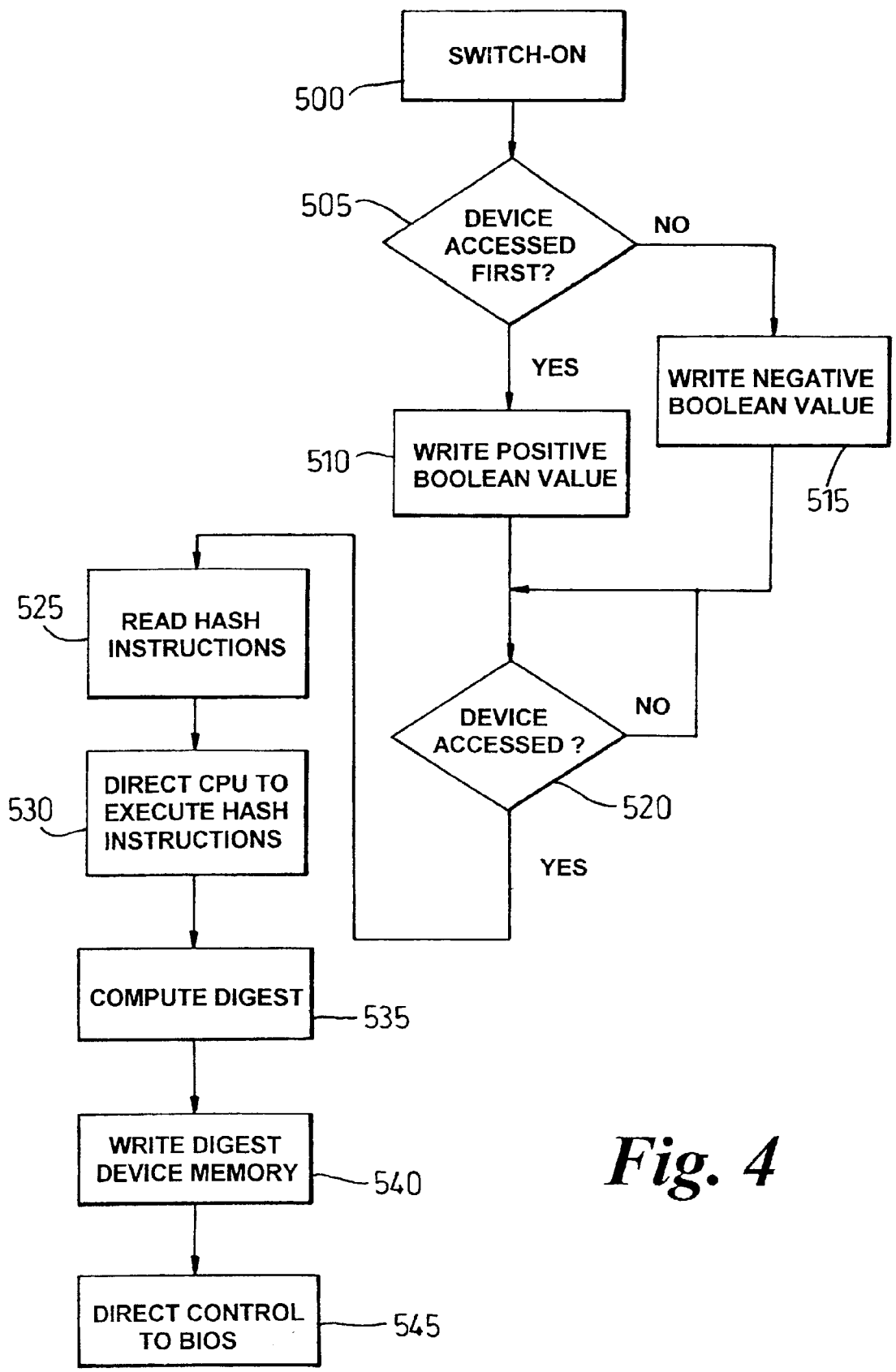
FIG. 4 shows a preferred process for obtaining an integrity metric.

A preferred process for acquiring an integrity metric will now be described with reference to FIG. 4.

In step 500, at switch-on, the measurement function 370 monitors the activity of the main processor 200 on the PCI bus 225 to determine whether the trusted device 260 is the first memory accessed. Under conventional operation, a main processor would first be directed to the BIOS memory first in order to execute the BIOS program. However, in accordance with the arrangement shown, the main processor 200 is directed to the trusted device 260, which acts as a memory. In step 505, if the trusted device 260 is the first memory accessed, in step 510, the measurement function 370 writes to volatile memory 335 a Boolean value which indicates that the trusted device 260 was the first memory accessed. Otherwise, in step 515, the measurement function writes a Boolean value which indicates that the trusted device 260 was not the first memory accessed.

In the event the trusted device 260 is not the first memory accessed, there is of course a chance that the trusted device 260 will not be accessed at all. This would be the case, for example, if the main processor 200 were manipulated to run the BIOS program first. Under these circumstances, the platform would operate, but would be unable to verify its integrity on demand, since the integrity metric would not be available. Further, if the trusted device 260 were accessed after the BIOS program had been accessed, the Boolean value would clearly indicate lack of integrity of the platform.

In step 520, when (or if) accessed as a memory by the main processor 200, the main processor 200 reads the stored native hash instructions 390 from the measurement function 370 in step 525. The hash instructions 390 are passed for processing by the main processor 200 over the data bus 225. In step 530, main processor 200 executes the hash instructions 390 and uses them, in step 535, to compute a digest of the BIOS memory 215, by reading the contents of the BIOS memory 215 and processing those contents according to the hash program. In step 540, the main processor 200 writes the computed digest 361 to the appropriate non-volatile memory location 335 in the trusted device 260. The measurement function 370, in step 545, then calls the BIOS program in the BIOS memory 215, and execution continues in a conventional manner.

Clearly, there are a number of different ways in which the integrity metric may be calculated, depending upon the scope of the trust required. The measurement of the BIOS program's integrity provides a fundamental check on the integrity of a platform's underlying processing environment. The integrity metric should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Other integrity checks could involve establishing that various other devices, components or apparatus attached to the platform are present and in correct working order. In one example, the BIOS programs associated with a SCSI controller could be verified to ensure communications with peripheral equipment could be trusted. In another example, the integrity of other devices, for example memory devices or co-processors, on the platform could be verified by enacting fixed challenge/response interactions to ensure consistent results. Where the trusted device 260 is a separable component, some such form of interaction is desirable to provide an appropriate logical binding between the trusted device 260 and the platform. Also, although in the present embodiment the trusted device 260 utilises the data bus as its main means of communication with other parts of the platform, it is feasible to provide alternative communications paths, such as hard-wired paths or optical paths—such an arrangement is described in greater detail below with reference to FIGS. 8 and 9. Further, although in the present embodiment the trusted device 260 instructs the main processor 200 to calculate the integrity metric in other embodiments, the trusted device itself is arranged to measure one or more integrity metrics.

Preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked.

Optionally, after receiving the computed BIOS digest, the trusted device 260 may inspect the proper value of the BIOS digest in the certificate and not pass control to the BIOS if the computed digest does not match the proper value. Additionally, or alternatively, the trusted device 260 may inspect the Boolean value and not pass control back to the BIOS if the trusted device 260 was not the first memory accessed. In either of these cases, an appropriate exception handling routine may be invoked.

Figure 5:
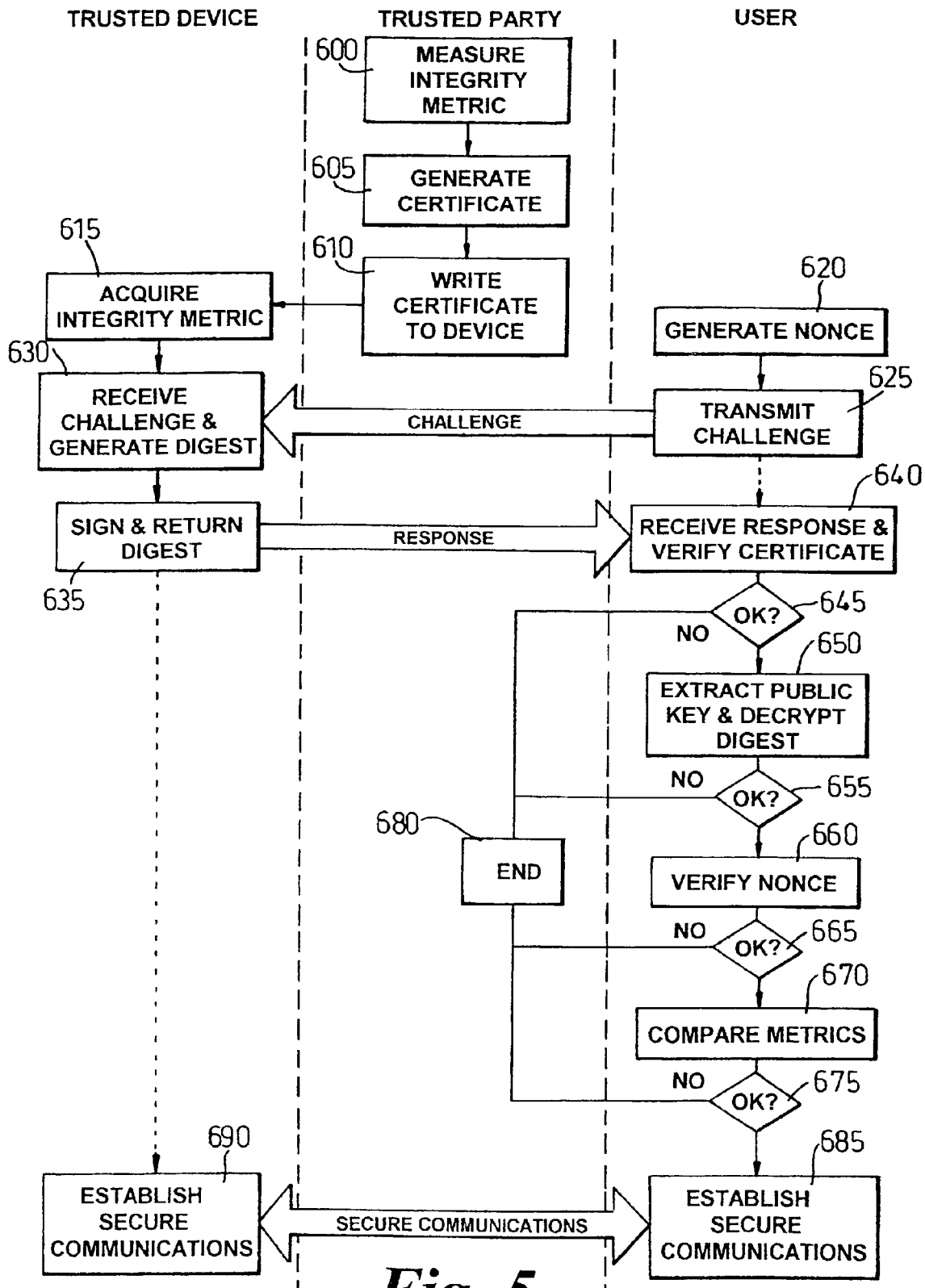
FIG. 5 shows a process for verifying the integrity of a trusted platform.

FIG. 5 illustrates the flow of actions by a TP, the trusted device 260 incorporated into a platform, and a user (of a remote platform) who wants to verify the integrity of the trusted platform. It will be appreciated that substantially the same steps as are depicted in FIG. 5 are involved when the user is a local user. In either case, the user would typically rely on some form of software application to enact the verification. It would be possible to run the software application on the remote platform or the trusted platform. However, there is a chance that, even on the remote platform, the software application could be subverted in some way. Therefore, it is anticipated that, for a high level of integrity, the software application would reside on a smart card of the user, who would insert the smart card into an appropriate reader for the purposes of verification. FIG. 5 illustrates the flow of actions for the general case—a more specific flow of actions for verification by a user smart card will be described with reference to FIG. 6 further below.

At the first instance, a TP, which vouches for trusted platforms, will inspect the type of the platform to decide whether to vouch for it or not. This will be a matter of policy. If all is well, in step 600, the TP measures the value of integrity metric of the platform. Then, the TP generates a certificate, in step 605, for the platform. The certificate is generated by the TP by appending the trusted device's public key, and optionally its ID label, to the measured integrity metric, and signing the string with the TP's private key.

The trusted device 260 can subsequently prove its identity by using its private key to process some input data received from the user and produce output data, such that the input/output pair is statistically impossible to produce without knowledge of the private key. Hence, knowledge of the private key forms the basis of identity in this case. Clearly, it would be feasible to use symmetric encryption to form the basis of identity. However, the disadvantage of using symmetric encryption is that the user would need to share his secret with the trusted device. Further, as a result of the need to share the secret with the user, while symmetric encryption would in principle be sufficient to prove identity to the user, it would insufficient to prove identity to a third party, who could not be entirely sure the verification originated from the trusted device or the user.

In step 610, the trusted device 260 is initialised by writing the certificate into the appropriate non-volatile memory locations of the trusted device 260. This is done, preferably, by secure communication with the trusted device 260 after it is installed in the motherboard 215. The method of writing the certificate to the trusted device 260 is analogous to the method used to initialise smart cards by writing private keys thereto. The secure communications is supported by a 'master key', known only to the TP, that is written to the trusted device (or smart card) during manufacture, and used to enable the writing of data to the trusted device 260; writing of data to the trusted device 260 without knowledge of the master key is not possible.

At some later point during operation of the platform, for example when it is switched on or reset, in step 615, the trusted device 260 acquires and stores the integrity metric of the platform.

When a user wishes to communicate with the platform, in step 620, he creates a nonce, such as a random number, and, in step 625, challenges the trusted device 260 (the operating system of the platform, or an appropriate software application, is arranged to recognise the challenge and pass it to the trusted device 260, typically via a BIOS-type call, in an appropriate fashion). The nonce is used to protect the user from deception caused by replay of old but genuine signatures (called a 'replay attack') by untrustworthy platforms. The process of providing a nonce and verifying the response is an example of the well-known 'challenge/response' process.

In step 630, the trusted device 260 receives the challenge and creates an appropriate response. This may be a digest of the measured integrity metric and the nonce, and optionally its ID label. Then, in step 635, the trusted device 260 signs the digest, using its private key, and returns the signed digest, accompanied by the certificate $Cert_{DP}$, to the user.

In step 640, the user receives the challenge response and verifies the certificate using the well known public key of the TP. The user then, in step 650, extracts the trusted device's 260 public key from the certificate and uses it to decrypt the signed digest from the challenge response. Then, in step 660, the user verifies the nonce inside the challenge response. Next, in step 670, the user compares the computed integrity metric, which it extracts from the challenge response, with the proper platform integrity metric, which it extracts from the certificate. If any of the foregoing verification steps fails, in steps 645, 655, 665 or 675, the whole process ends in step 680 with no further communications taking place.

Assuming all is well, in steps 685 and 690, the user and the trusted platform use other protocols to set up secure communications for other data, where the data from the platform is preferably signed by the trusted device 260.

Further refinements of this verification process are possible. It is desirable that the challenger becomes aware, through the challenge, both of the value of the platform integrity metric and also of the method by which it was obtained. Both these pieces of information are desirable to allow the challenger to make a proper decision about the integrity of the platform. The challenger also has many different options available—it may accept that the integrity metric is recognised as valid in the trusted device 260, or may alternatively only accept that the platform has the relevant level of integrity if the value of the integrity metric is equal to a value held by the challenger (or may hold there to be different levels of trust in these two cases).

The techniques of signing, using certificates, and challenge/response, and using them to prove identity, are well known to those skilled in the art of security and therefore need not be described in any more detail herein.

Figure 7:
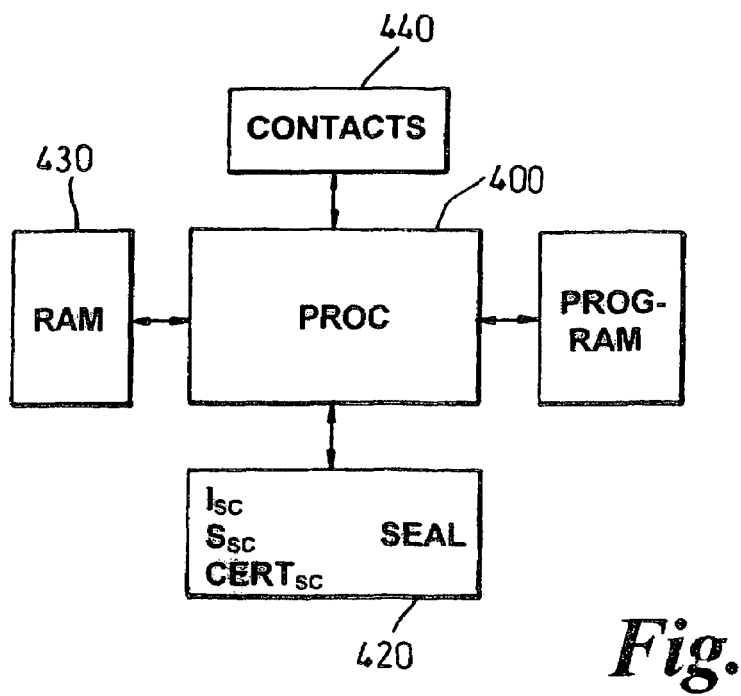
FIG. 7 shows the processing engine of a user smart card suitable for use in the process of FIG. 6.

In preferred arrangements of the system, a user employs a smart card 122 to verify a trusted platform. The processing engine of a smartcard suitable for use in accordance with the preferred embodiment is illustrated in FIG. 7. The processing engine comprises a processor 400 for enacting standard encryption and decryption functions, to support verification of information received from elsewhere. In the present embodiment, the processor 400 is an 8-bit microcontroller, which has a built-in operating system and is arranged to communicate with the outside world via asynchronous protocols specified through ISO 7816-3, 4, T=0, T=1 and T=14 standards. The smartcard also comprises non-volatile memory 420, for example flash memory, containing an identifier $I_{SC}$ of the smartcard 122, a private key $S_{SC}$, used for digitally signing data, and a certificate $Cert_{SC}$, provided by a trusted third party certification agency, which binds the smartcard with public-private key pairs and includes the corresponding public keys of the smartcard 122 (the same in nature to the certificate $Cert_{DP}$ of the trusted device 260). Further, the smartcard contains 'seal' data SEAL in the non-volatile memory 420, which can be represented graphically by the trusted display processor 260 to indicate to the user that a process is operating securely with the user's smartcard, as will be described in detail below. In the present embodiment, the seal data SEAL is in the form of an image pixmap, which was originally selected by the user as a unique identifier, for example an image of the user himself, and loaded into the smartcard 122 using well-known techniques. The processor 400 also has access to volatile memory 430, for example RAM, for storing state information (such as received keys) and providing a working area for the processor 400, and an interface 440, for example electrical contacts, for communicating with a smart card reader.

Seal images can consume relatively large amounts of memory if stored as pixmaps. This may be a distinct disadvantage in circumstances where the image needs to be stored on a smartcard 122, where memory capacity is relatively limited. The memory requirement may be reduced by a number of different techniques. For example, the seal image could comprise: a compressed image, which can be decompressed by the trusted device 260; a thumb-nail image that forms the primitive element of a repeating mosaic generated by the trusted device 260; a naturally compressed image, such as a set of alphanumeric characters, which can be displayed by the trusted device 260 as a single large image, or used as a thumb-nail image as above. In any of these alternatives, the seal data itself may be in encrypted form and require the trusted device 260 to decrypt the data before it can be displayed. Alternatively, the seal data may be an encrypted index, which identifies one of a number of possible images stored by the host computer 100 or a network server. In this case, the index would be fetched by the trusted device 260 across a secure channel and decrypted in order to retrieve and display the correct image. Further, the seal data could comprise instructions (for example PostScript™ instructions) that could be interpreted by an appropriately programmed trusted device 260 to generate an image.

Figure 6:
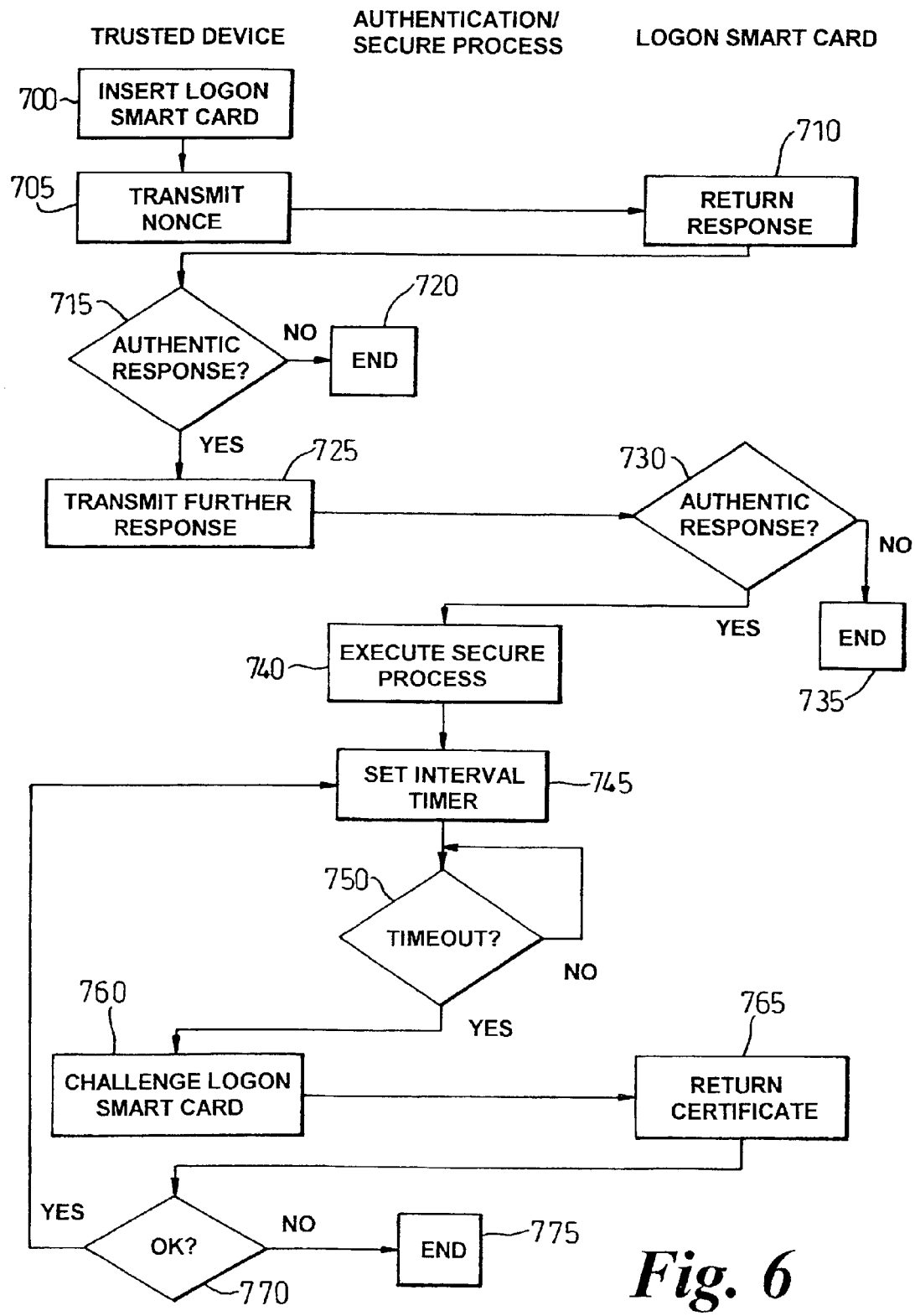
FIG. 6 shows a process for verifying the integrity of a trusted platform by a user with a smart card.

As indicated above, FIG. 6 shows the flow of actions in an example of verification of platform integrity by a user interacting with the trusted platform with a smart card 122. As will be described, the process conveniently implements a challenge/response routine. There exist many available challenge/response mechanisms. The implementation of an authentication protocol used in the present embodiment is mutual (or 3-step) authentication, as described in ISO/IEC 9798-3, "Information technology—Security techniques—Entity authentication mechanisms; Part 3; Entity authentication using a public key algorithm", International Organization for Standardization, November 12293. Of course, there is no reason why other authentication procedures cannot be used, for example 2-step or 4-step, as also described in this reference.

Initially, the user inserts their smart card 122 into the smart card reader 120 of the platform in step 700.

Beforehand, a platform configured for use by users of in this way will typically be operating under the control of its standard operating system and executing the authentication process, which waits for a user to insert their smart card 122. Apart from the smart card reader 120 being active in this way, such a platform is typically rendered inaccessible to users by 'locking' the user interface (i.e. the screen, keyboard and mouse).

When the smart card 122 is inserted into the smart card reader 120, the trusted device 260 is triggered to attempt mutual authentication in step by generating and transmitting a nonce A to the smart card 122 in step 705. A nonce, such as a random number, is used to protect the originator from deception caused by replay of old but genuine responses (called a 'replay attack') by untrustworthy third parties.

In response, in step 710, the smart card 122 generates and returns a response comprising the concatenation of: the plain text of the nonce A, a new nonce B generated by the smart card 122, an ID of the trusted device 260 and some redundancy; the signature of the plain text, generated by signing the plain text with the private key of the smart card 122; and a certificate containing the ID and the public key of the smart card 122.

The trusted device 260 authenticates the response by using the public key in the certificate to verify the signature of the plain text in step 715. If the response is not authentic, the process ends in step 720. If the response is authentic, in step 725 the trusted device 260 generates and sends a further response including the concatenation of: the plain text of the nonce A, the nonce B, an ID of the smart card 122 and the acquired integrity metric; the signature of the plain text, generated by signing the plain text using the private key of the trusted device 260; and the certificate comprising the public key of the trusted device 260 and the authentic integrity metric, both signed by the private key of the TP.

The smart card 122 authenticates this response by using the public key of the TP and comparing the acquired integrity metric with the authentic integrity metric, where a match indicates successful verification, in step 730. If the further response is not authentic, the process ends in step 735.

If the procedure is successful, both the trusted device 260 has authenticated the smart card 122 and the smart card 122 has verified the integrity of the trusted platform and, in step 740, the authentication process executes the secure process for the user.

In certain types of interaction, the authentication process can end at this point. However, if a session is to be continued between the user and the trusted platform, it is desirable to ensure that the user remains authenticated to the platform.

Where continued authentication is required, the authentication process sets an interval timer in step 745. Thereafter, using appropriate operating system interrupt routines, the authentication process services the interval timer periodically to detect when the timer meets or exceeds a pre-determined timeout period in step 750.

Clearly, the authentication process and the interval timer run in parallel with the secure process. When the timeout period is met or exceeded, the authentication process triggers the trusted device 260 to re-authenticate the smart card 122, by transmitting a challenge for the smart card 122 to identify itself in step 760. The smart card 122 returns a certificate including its ID and its public key in step 765. In step 770, if there is no response (for example, as a result of the smart card 122 having been removed) or the certificate is no longer valid for some reason (for example, the smart card has been replaced with a different smart card), the session is terminated by the trusted device 260 in step 775. Otherwise, in step 770, the process from step 745 repeats by resetting the interval timer.

Additionally, or alternatively, in some embodiments it may be required that the user profile is encrypted and signed to protect privacy and integrity. If so, a secure data transfer protocol may be needed between the trusted device 260 and the smart card 122. There exist many available mechanisms for transferring secure credentials between two entities. A possible implementation, which may be used in the present embodiment, is secure key transport mechanisms from ISO/IEC DIS 11770-3, "Information technology—Security techniques—Key management—Part 3: Mechanisms using asymmetric techniques", International Organization for Standardization, March 1997.

Modifications of this verification process using other well-known challenge and response techniques can easily be achieved by the skilled person. Similarly, alternative verification processes can be used by parties interacting with the platform in a different manner (that is, other than as a user equipped with a smart card).

As described above, the trusted device 260 lends its identity and trusted processes to the host computer and the trusted display processor has those properties by virtue of its tamper-resistance, resistance to forgery, and resistance to counterfeiting. Only selected entities with appropriate authentication mechanisms are able to influence the processes running inside the trusted device 260. Neither an ordinary user of the host computer, nor any ordinary user or any ordinary entity connected via a network to the host computer may access or interfere with the processes running inside the trusted device 260. The trusted device 260 has the property of being "inviolate".

It will be apparent from FIG. 3 that the frame buffer memory 315 is only accessible by the trusted display processor 260 itself, and not by the CPU 200. This is an important feature of the preferred embodiment, since it is imperative that the CPU 200, or, more importantly, subversive application programs or viruses, cannot modify the pixmap during a trusted operation. Of course, it would be feasible to provide the same level of security even if the CPU 200 could directly access the frame buffer memory 315, as long as the trusted display processor 260 were arranged to have ultimate control over when the CPU 200 could access the frame buffer memory 315. Obviously, this latter scheme would be more difficult to implement.

A typical process by which graphics primitives are generated by a host computer 100 will now be described by way of background. Initially, an application program, which wishes to display a particular image, makes an appropriate call, via a graphical API (application programming interface), to the operating system. An API typically provides a standard interface for an application program to access specific underlying display functions, such as provided by Windows NT™, for the purposes of displaying an image. The API call causes the operating system to make respective graphics driver library routine calls, which result in the generation of graphics primitives specific to a display processor, which in this case is the trusted display processor 260. These graphics primitives are finally passed by the CPU 200 to the trusted display processor 260. Example graphics primitives might be 'draw a line from point x to point y with thickness z' or 'fill an area bounded by points w, x, y and z with a colour a'.

The control program of the microcontroller 300 controls the microcontroller to provide the standard display functions to process the received graphics primitives, specifically:

receiving from the CPU 200 and processing graphics primitives to form pixmap data which is directly representative of an image to be displayed on the VDU 105 screen, where the pixmap data generally includes intensity values for each of the red, green and blue dots of each addressable pixel on the VDU 105 screen;

storing the pixmap data into the frame buffer memory 315; and periodically, for example sixty times a second, reading the pixmap data from the frame buffer memory 315, converting the data into analogue signals using the video DAC and transmitting the analogue signals to the VDU 105 to display the required image on the screen.

Apart from the standard display functions, the control program includes a function to mix display image data deceived from the CPU 200 with trusted image data to form a single pixmap. The control program also manages interaction with the cryptographic processor.

The trusted display processor 260 forms a part of the overall 'display system' of the host computer 100; the other parts typically being display functions of the operating system, which can be 'called' by application programs and which access the standard display functions of the graphics processor, and the VDU 105. In other words, the 'display system' of a host computer 100 comprises every piece of hardware or functionality which is concerned with displaying an image.

Figure 8:
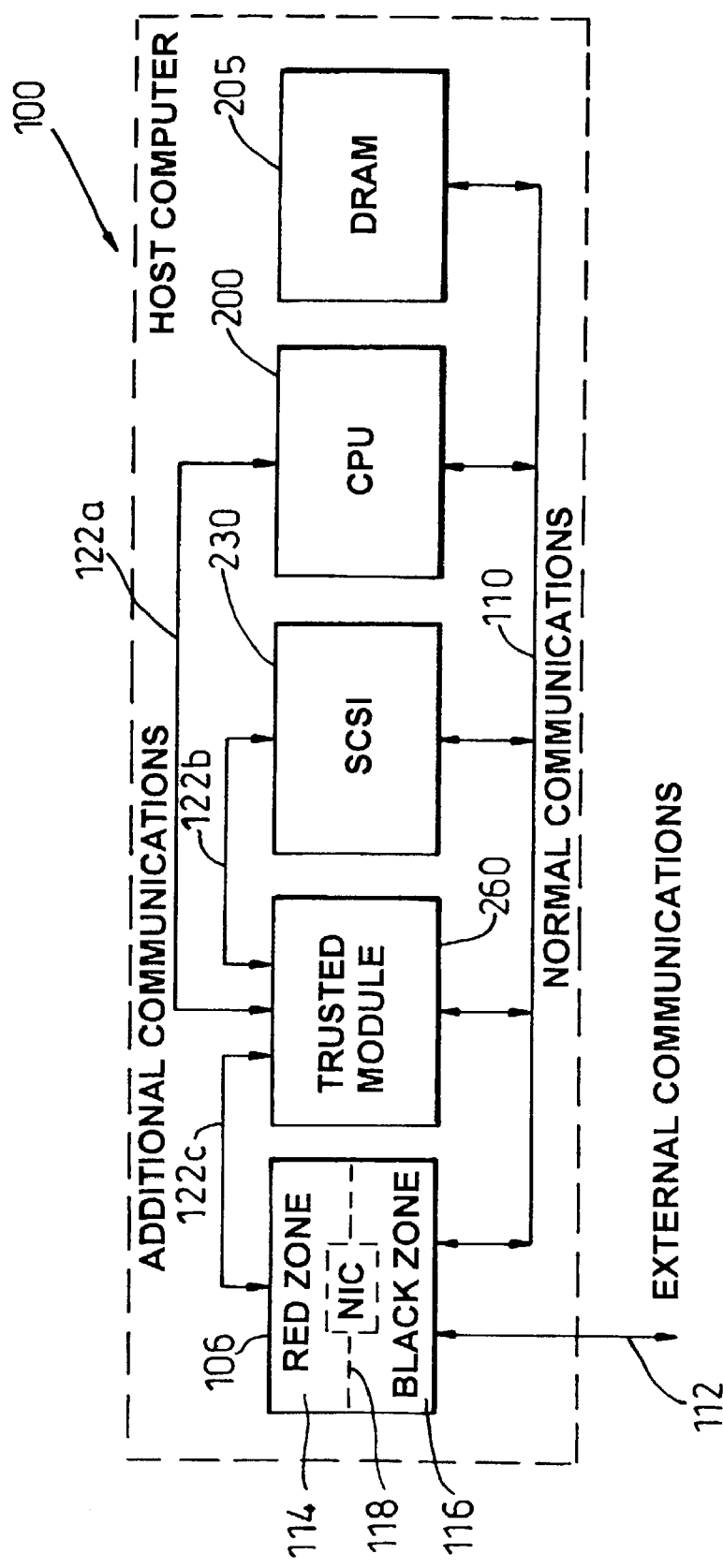
FIG. 8 shows a modification to the arrangement of FIG. 2 to provide trusted communication paths between the trusted device and other components of the host computer.

Referring now to FIG. 8, a preferred arrangement is shown in which trusted communication paths are provided for use by the trusted component 260. Such an arrangement is described more fully in the applicant's copending International Patent Application No. PCT/GB 00/00504 entitled "Communication between Modules of a Computing Apparatus" filed on 15 Feb. 2000 and incorporated by reference herein. In FIG. 8 (in which only some of the elements of FIG. 2 are shown), a host computer 100 has a main CPU 200, a SCSI interface 230, a PCI network interface card 106 and DRAM memory 205 with conventional ("normal") communications paths 110 (such as ISA, EISA, PCI, USB) therebetween. The network interface card 106 also has an external communication path 112 with the world outside the host computer 100.

The network interface card 106 is logically divided into "red" and "black" data zones 114,116 with an interface 118 therebetween. In the red zone 114, data is usually plain text and is sensitive and vulnerable to undetectable alteration and undesired eavesdropping. In the black data zone 116, data is protected from undetected alteration and undesired eavesdropping (preferably encrypted by standard crypto mechanisms). The interface 118 ensures that red information does not leak into the black zone 116. The interface 118 preferably uses standard crypto methods and electronic isolation techniques to separate the red and black zones 114,116. The design and construction of such red and black zones 114,116 and the interface 118 is well known to those skilled in the art of security and electronics, particularly in the military field. The normal communication path 110 and external communication path 112 connect with the black zone 116 of the network interface card 106.

The host computer 100 also includes a trusted module 260 which is connected, not only to the normal communication paths 110, but also by mutually separate additional communication paths 122 (sub-referenced 122a,122b,122c) to the CPU 220, SCSI interface 230 and the red zone 114 of the network interface card 106. Other arrangements are possible, and not all components are provided with such dedicated conununications paths—by way of example, the trusted module 260 does not have such a separate additional communication path 122 with the memory 205.

The trusted module 260 can communicate with the CPU 102, SCSI interface 230 and red zone 114 of the network interface card 106 via the additional communication paths 122a,b,c, respectively. It can also communicate with the CPU 260, SCSI interface 230, black zone 116 of the network interface card 106 and the memory 205 via the normal communication paths 110. The trusted module 260 can also act as a 100 VG switching centre to route certain information between the CPU 200, SCSI interface 230 and the red zone 114 of the network interface card 106, via the trusted module 260 and the additional communication paths 122, under control of a policy stored in the trusted module. The trusted module 260 can also generate cryptographic keys and distribute those keys to the CPU 200, the SCSI interface 230, and the red zone 114 of the network interface card 106 via the additional communication paths 122a,b,c, respectively.

Figure 9:
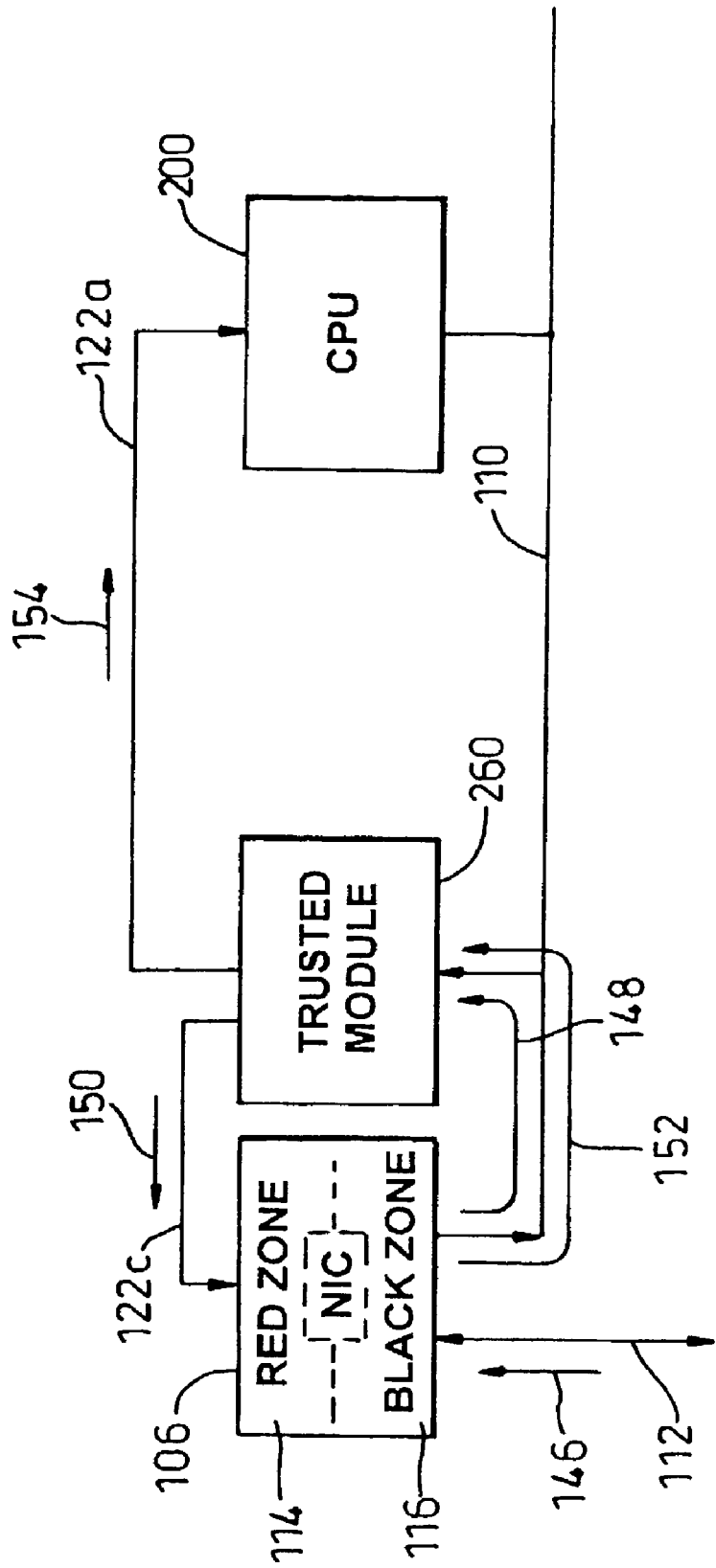
FIG. 9 shows a process by which incoming messages are decrypted in the arrangement of FIG. 8 when the trusted device is the only component of the host computer with cryptographic capabilities.

FIG. 9 illustrates the process by which incoming external secure messages are processed when the trusted module 260 is the only module in the platform with cryptographic capabilities. An external message 146 is received by the black zone 116 of the network interface card 106 using the external communication path 112. The network interface card 106 sends a protocol data unit 148 containing some data and a request for an authentication and integrity check to the trusted module 260 using the normal communication paths 110. The trusted module 260 performs the authentication and integrity checks using the long term keys inside the trusted module 260 that must not revealed outside the trusted module 260, and sends a protocol data unit 150 containing an 'OK' indication to the red zone 114 of the network interface card 106 using the additional communication path 122c. The network interface card 106 then sends a protocol data unit 152 containing some data and a request for decryption to the trusted module 260 using the normal communication paths 110. The trusted module 260 decrypts the data using either temporary or long term keys inside the trusted module 260, and sends a protocol data unit 154 containing the decrypted data to the CPU 200 using the additional communication path 122a. The CPU then takes appropriate action.

A system for implementing a specific embodiment of the invention will now be described with reference to FIG. 10.

The user logs into a client trusted platform 1001, in preferred arrangement with the assistance of a user smart card 1008 connecting to the client trusted platform 1001 through a smart card reader 1007. The client trusted platform, smart card and interaction therebetween may be essentially as described in FIGS. 1 to 9 above (although this is not essential for implementation of all embodiments of the invention). Within the client trusted platform there is therefore a client trusted component 1003 which contains a display processor such that the output on the display 1005 is controlled by the client trusted component, and is therefore reliable. Also contained within the client trusted platform 1001 are an area of memory containing remote imaging code 1004 and an area of protected memory 1009. These need to be available for reliable use. Ideally, these might be sited within the trusted component 1003 itself—this however may result in the trusted component being expensive to produce (provision of some or all of the protected memory 1009 within a trusted component is a balance between security and cost). A potentially cheaper alternative, shown in FIG. 10, is for the protected memory 1009 and the remote imaging code 1004 to be located outside the trusted component 1003 but connected to it by secure communication paths 1002 (preferably a dedicated communications link, ideally hardwired and isolated from any other components of the client trusted platform 1001, essentially as described in FIGS. 8 and 9). If the protected memory 1009 and the remote imaging code 1004 are located on the client trusted platform in such a way that they are accessible to any component of the client trusted platform other than the client trusted component 1003, it is desirable at least that their integrity is monitored by the client trusted component, for example as described in the applicant's copending International Patent Application No. PCT/GB 00/02003 entitled "Data Integrity Monitoring in Trusted Computing Entity" filed on 25 May 2000, which is incorporated by reference herein. The client trusted platform 1001 will contain components as shown in FIG. 1 (including a keyboard or other such devices for user input) which need not be described further here.

The display 1005 operates under the control of the client trusted component 1003. In a preferred arrangement (as will be described further below), a selected area of pixels 1006 in the display are arranged to operate under direct control of a remote server when the system is operating in client/server mode. It will be appreciated that a display 1005 is not the only possible way of providing data to a user—rather than image data, the server may provide audio data or video data to be played in part by an audio player (preferably a secure audio player protected from subversion in the same manner as display 1005—less effective in the case of an audio player, because of the greater ease of re-recording the content from the playback in the case of audio) or may provide other forms of output to the user altogether. In implementation of the present invention, the functional purpose of the data is not critical—it is the protection of the data from unauthorised use that is significant.

The client trusted component 1003 ensures that the image output on the display 1005 corresponds to the execution of the data. The client trusted component is also required for authentication of the server trusted component 1106 (see below). Advantageously, the client trusted component is also adapted to verify the data protection capabilities of the server trusted component 1106. Other roles which may be required of the client trusted component 1003 are verification of a user smart card 1008 where employed and also to provide trustworthy performance-related information—whether indication of trustworthiness of the platform in executing code, or reliable metering of code or data execution, provision of reports or of billing information.

The server 1109 is in this arrangement also a trusted platform of the kind described with reference to FIGS. 1 to 9 (though trusted display functionality is probably not required, and other arrangements are clearly possible). The server 1109 contains a server trusted component 1106 and an area of memory containing remote image sending code 1103, together with a memory to store application data 1107. Again, the remote image sending code 1103 in particular may reside within the server trusted component 1106, or one of the alternative arrangements described with reference to the client trusted component 1003 employed.

The server trusted component 1106 needs to be able to authenticate the client trusted component 1003, the user smart card 1008, or both, depending on the usage model. It may also need to be adapted to hold information relating to the client (registration information, client data, or client billing data) securely—either in the server trusted component 1106 itself, or in associated memory which is monitored by the server trusted component 1106. Again, it may be desirable for billing reporting and metering capabilities to be included within the server trusted component 1106.

The user smart card 1008, where used, will generally need to be able to authenticate either the client trusted component 1003, the server trusted component 1106, or both. It may also be desirable for the user smart card 1008 to be able to verify the data protection capabilities of the server trusted component 1106.

The image sending code 1103 must be adapted to determine whether the client platform is adapted to handle the image code securely (preferably this will involve authentication of the client trusted component and will be best handled within the server trusted component) and whether the client platform (or a smart card in session with it) is licensed or otherwise permitted to receive image data. The image sending code must also be adapted to receive and interpret requests for image data (or for data execution) received from the client platform. The image sending code may also be required to obtain user account information from the client platform or a user smart card. The image sending code 1103 also needs to be able to engage in secure communication with the client platform (perhaps with the assistance of a cryptographic processor within the server trusted component.

The image receiving code 1004 must be adapted to communicate with the server—both to make requests for image data directly, or for code to execute on the server, and to receive image data from the server. It is desirable for the image receiving code to be trusted by the server, the user, or any other party interacting with the client platform. It is therefore preferred that on booting up of the client platform, the client trusted component measures an integrity metric of the image receiving code 1004 (and alerts the user, or even fails to boot, if the integrity metric does not match with the stored metric). Again, the image receiving code 1004 will need to interact with a cryptographic processor (perhaps within the client trusted component), perhaps along a secure communication path of the type shown in FIG. 8, in order to communicate securely with the server.

The basic principle of operation is that applications are (in whole or in part) run on the server 1109. Mutual authentication of the server trusted component 1106 and the client trusted component 1003 (or perhaps of the user trusted component on smartcard 1008) is first achieved (essentially as described in FIG. 5) to allow the application to be run. When the application is run, the server 1109 provides securely image data 1108 to the client trusted component 1003 which is then used to drive the display 1005. User data will be required for useful operation. This is provided by user input at the client platform (or in some cases from data stored in the client platform) and sent back (user data message 1010), again securely, to the server 1109 for use by the application. Such communication is repeated whenever updates are required to the display 1005 or when user input is required.

This process may operate according to any of a number of different operational models. The trusted server 1109 may be controlled by a software developer, and be used as a way of offering trial software to a user, or to enable a user to use software on a metered basis. The trusted server operator need not be a software developer, even for this purpose, but may instead be another party trusted by the software developer to execute the data on their platform (or alternatively to relay an image obtained from a developer). A further possibility is for the trusted server to be controlled by an internet service provider offering acting as an intermediary between users and software developers.

In essence, the arrangement allows for a "service provider" (in the most general sense) to provide information to (effectively, to control) some or all of a user's screen with a degree of security that the information provided by the service provider will not be put to an unintended use. This may therefore be an effective way to provide content (perhaps particularly effective for interactive content) on a metered basis. As the service provider has effective control of the display 1005, a reserved zone 1006 may be used for purposes selected by the service provider rather than the user—such as for display of advertising, proprietary information, or other information not directly associated with the user-requested service (trial software, content provision, etc.). This server-determined information could be provided within a defined area (as shown in FIG. 10) or over different areas (for example, the whole screen at a predetermined time interval or during pauses in code operation or the user-requested information), and may be static or change with time (e.g. streaming video) and could be supplemented with audio information.

A number of different models for running services over such an arrangement can be employed. In the simplest form, "licensed" data is executed on the server, and not on the client. In return for payment, the client receives imaging information corresponding to the execution of the data on the trusted server. This is sent via the remote image sending code on the server. Thereafter, the remote image receiving code on the client machine sends to the server keyboard strokes, corresponding to the selections of the user, and receives in return imaging information, corresponding to the changing execution of the application. The imaging information is sent directly from the trusted server via a secure channel such as PPTP to the trusted component within the client, which is adapted to display the imaging information directly without having to involve any untrusted parts of the computing apparatus.

It is not efficient in all cases to run all software on the server rather than the client. For relatively sensitive information (this might apply for data access, or where there may be substantial overlap each time the software runs) it might be applicable to store temporarily all of the image in client protected memory, and have the software displayed on the client, but actually running on the server. The client at no stage stores the software apart from the image stored in the protected memory, and therefore is not liable to license infringement attacks on the data via the hard disk or other storage media. For less sensitive information, and especially where an application may produce differing images each time it is run, as is usually the case with game software, it would probably be more appropriate to run the software only partly from the server; for example, essentially running locally, but needing certain critical input from the server (such as an on-line service) in order to run the software. The server must still have overall control, so that although the client machine may be able to run the program, the run cannot succeed without the server being involved. There are different ways of carrying this out: for example, the server could supply key bits of the information, and transmit the image in communal blocks which would be the same for all clients, with the client trusted component repeatedly authenticating to the server trusted component for personalised information or key bits; or some of the data could be stored locally, with the server transmitting additional data to the protected memory. For the sake of efficiency, during and after execution, only part of the information (such as the key bits) is stored in the protected memory, and the rest can be stored on the hard disk or other storage media. This partial model of image transfer can be used concurrently with total models for different data on the same server.

Figure 10:
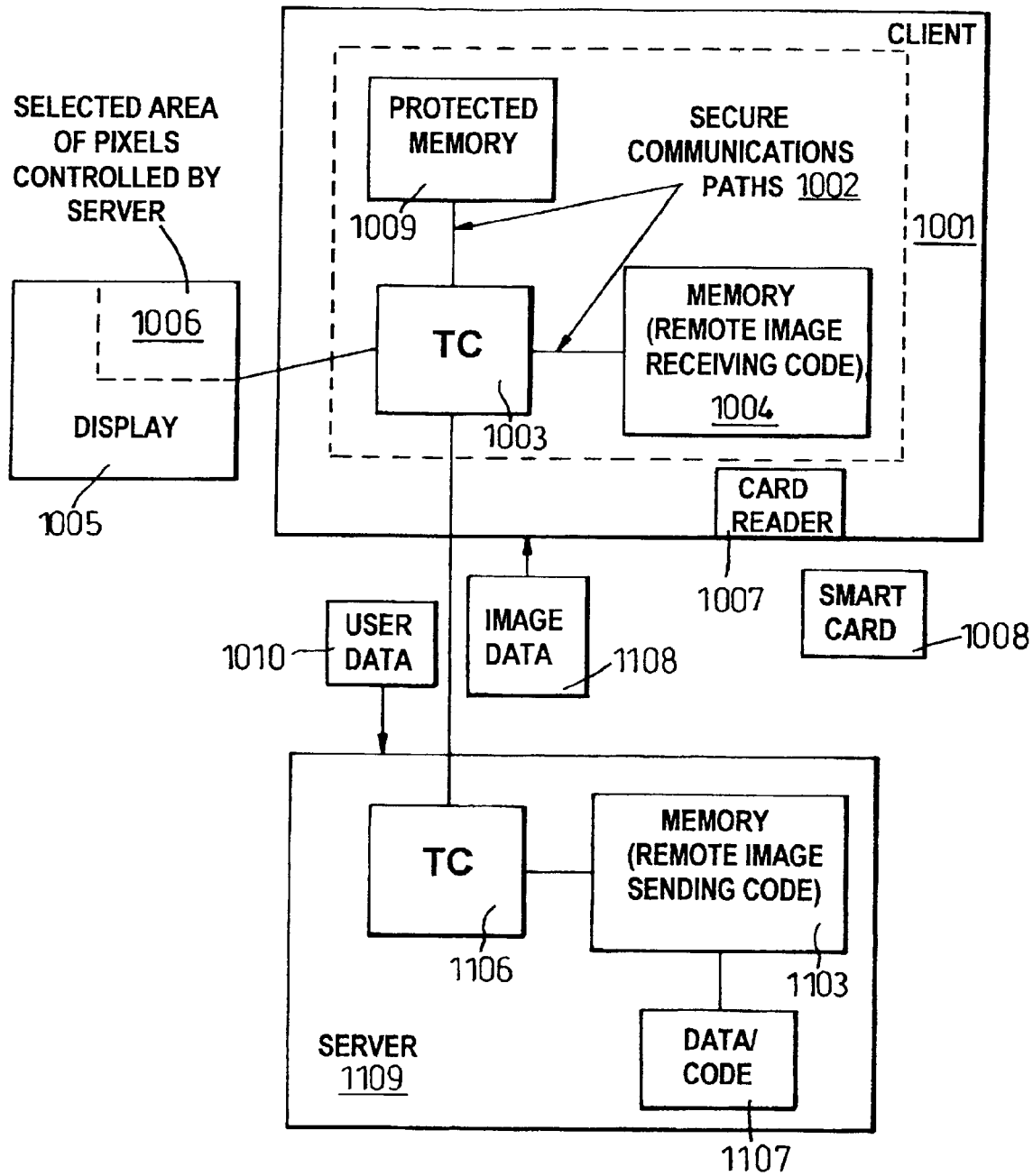
FIG. 10 shows the basic elements of a client/server system according to an embodiment of the invention.

A procedure by which the arrangement of FIG. 10 is operated such that client trusted platform 1001 acts as a "trusted terminal" for display of image data from trusted server 1109 will now be described with reference to FIG. 11. This arrangement may be useful for any of the "services" indicated above: for example, when the user of the client trusted platform 1001 wishes to view (but not acquire) a document or wishes to use software on a pay-per-use basis.

Figure 11:
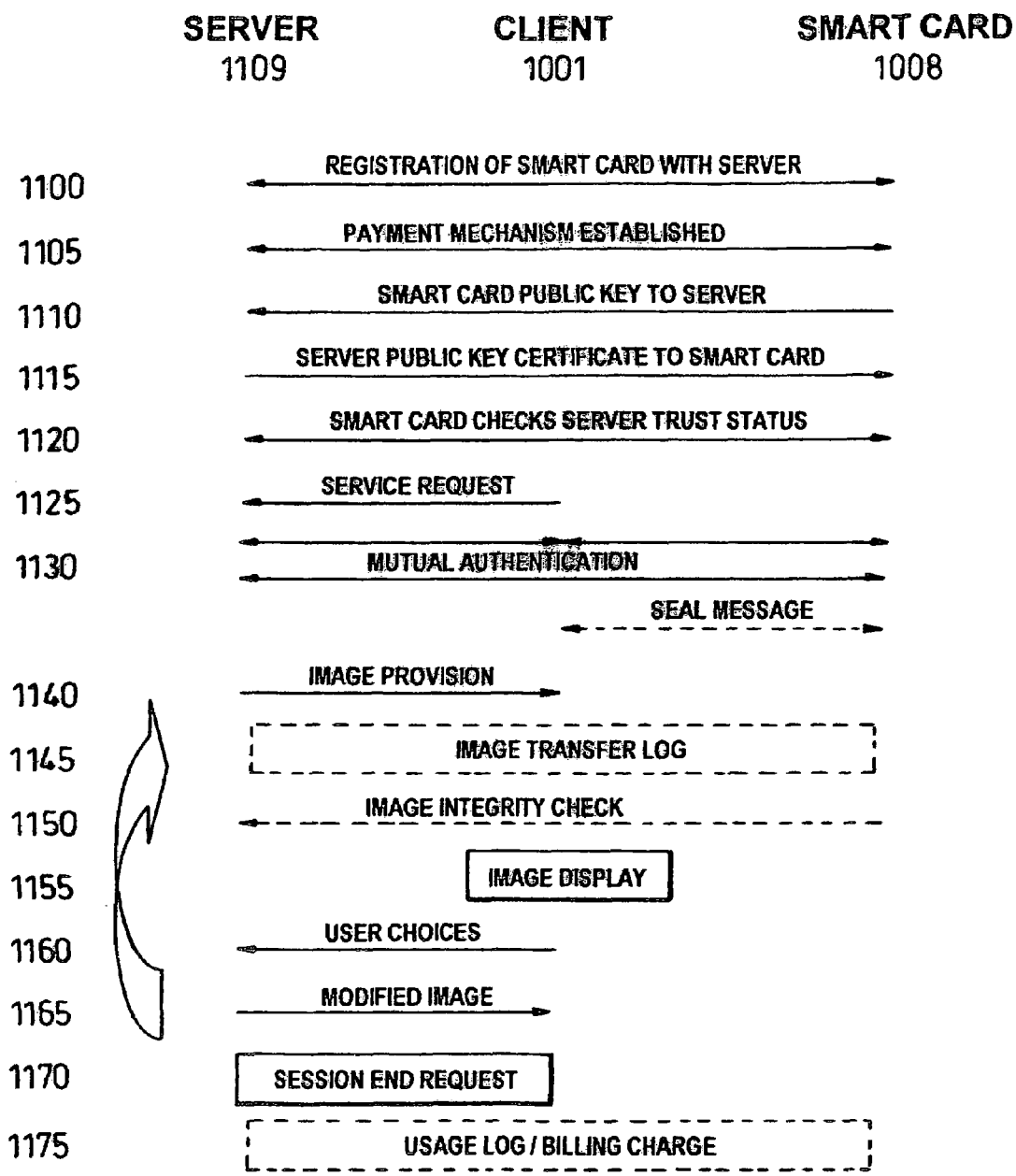
FIG. 11 shows a process for trusted terminal operation of the client/server system of FIG. 10 according to an embodiment of the invention.

In the arrangement shown in FIG. 11, a user smart card 1008 is used to provide the user interaction with the server 1109, with the client trusted component 1003 serving to confirm that the client 1001 can provide a trusted display and acting as an intermediary between the user smart card 1008 and the client trusted component 1003. In alternative arrangements, the client trusted component 1003 may act for the user, rather than the user smart card 1008, in which case interactions between the user smart card 1008 and the server 1109 (generally the server trusted component 1106) may be replaced by interactions between the client trusted component 1003 and the server 1109.

The first phase, consisting of initial set-up to allow the "trusted terminal" operation of the client trusted platform 1001 to function, may take place either when trusted terminal functionality is required or at any earlier time. If interaction is to be between the trusted server 1109 and the user smart card 1008, the initial set-up phase need not employ the client trusted platform 1001 at all—another client trusted platform could be used (an advantage of registering with a smart card may be the ability then to use essentially any client trusted platform with trusted display functionality to access the data or operations for which the smart card is registered. Alternatively, all the set-up steps could be replaced by the issuance of a specific smart card 1008 adapted to allow trusted terminal execution for specific data or operations on the trusted server 1109 (this could be a smart card used as an auxiliary to a user's main smart card—an arrangement for carrying this out is described in the applicant's copending International Patent Application No. PCT/GB 00/00751 entitled "Computing Apparatus and Methods of Operating Computing Apparatus" filed on 3 Mar. 2000, the contents of which are incorporated by reference herein).

At the start of the first phase the user registers (step 1100) his smart card 1008 (or client platform 1001, as indicated above—registration of a client platform rather than a smart card is not explicitly described hereafter) with the trusted server 1109. At this stage, a payment mechanism may be arranged. A simple approach (step 1105) is for the smart card 1008 to be charged up with credit to cover a certain quantity of data purchase or code usage, but other models (such as provision of billing details plus establishment of a mechanism for secure logging and reporting of usage data, by or to the smart card, a client platform, the trusted server or elsewhere) are possible. If it has not already been received in the registration step 1100, the smart card 1008 now provides its public key to the trusted server 1109 (step 1110). In return, the trusted server 1109 installs the public key certificate of the server trusted component 1106 into the user smart card 1008 (step 1115). This allows authentication of the trusted server 1109 by the smart card 1008: in response to an authorisation request by the user smart card 1008 incorporating a nonce, the trusted server 1109 returns a message including its public key certificate and the nonce, signed with its private key; the user smart card can thus check that the message truly originated from the trusted server 1109. Preferably (step 1120) the user checks that the trusted server can indeed be trusted, using the user smart card 1008 to verify the protection capabilities of server trusted component 1106 (from integrity metrics or other trusted data held or obtainable by or with reference to the server trusted component 1106).

The second phase is data execution, and requires use of a client platform with a trusted display. The first step is the request (generally via the operating system on the client trusted platform 1001) for data to be displayed which is only obtainable from trusted server 1109 (step 1125). For the smart card model, the user smart card 1008 now needs to be in session with a client trusted platform 1001. The next step (step 1130) is one of mutual authentication between the different trusted components present: user smart card 1008 client trusted component 1003 and server trusted component 1106, for the arrangement described in FIG. 11. Optionally, in the case of authentication between the user smart card 1008 and the client trusted component 1003, a special displayed message personal to the user smart card 1008 (a seal image) may be displayed on the display 1005 at this point (this process is described in more detail in the applicant's copending International Patent Application No. PCT/GB 00/012296, entitled "System for Digitally Signing a Document", filed on 25 May 2000 and incorporated herein by reference), with the user being asked to give confirmation that he wishes the process to continue (and perhaps further authentication of his association with the smart card—for example, by entering a password), the user smart card 1008 then being left in the smart card reader 1107.

The image data requested by the operating system of the client platform 1001 is then provided by the trusted server 1109 (step 1140), preferably by a secure communications channel or process (such as PPTP) to the protected memory 1009. Optionally, an image transfer log is made or updated (step 1145)—alternative approaches to creation and maintenance of image transfer logs are discussed further below. Another optional step (step 1150) is for an integrity check to be performed by the user smart card 1008 by checking a signature of the image data with the server trusted component public key, to verify whether this data is indeed from the expected source.

The image data received from the trusted server 1109 is then displayed (step 1155) on the display 1005 operating under control of the trusted display processor functionality of the client trusted component 1003. At least a part of the image displayed is that stored within protected memory 1009—other parts of the image displayed may, in appropriate arrangements, be from processes operating entirely within the client platform 1001. The user may now provide input to the client trusted platform 1001 through the normal user interface, and this information is provided (as message 1010) to the trusted server 1109 (step 1160), again preferably using a secure communications channel. Execution of the data on the trusted server 1109 is then modified, or alternative data selected, according to the user choice, resulting in the provision of modified image data by the trusted server 1109 (step 1165). The processes from steps 1145 to 1165 may then be repeated as often as necessary. A request to end the session may be made by the trusted server 1109 (for example, when credit has been exhausted) or by the user (step 1170). Optionally, this may be followed by making or updating a usage log (alternative possibilities for such a log are discussed below)—an addition or an alternative may be the making of a billing charge to the user (step 1175).

If the provision of image data is free or unlimited (if, for example, the purpose of using the trusted terminal arrangement is only to prevent release of executing code to individual users, or if the only "payment" required is the display of advertising provided by the trusted server), there may be no need to provide a usage log (or billing information). If a usage log is required, there are at least three options available for providing it.

A first option is for usage information to be stored on the trusted server 1109. Usage can be logged by the trusted server 1109 at the time of each image data transfer to the client platform 1001. Billing information (such as a credit card or other account to which use can be billed) can be obtained from the user (by smart card or client trusted component, or from elsewhere) in the registration process, and also stored on the trusted server 1109. Preferably, all such information (particularly the user account information) is held within the server trusted component 1106. An alternative is for the information to be held in other memory within the trusted server 1109, but secured with a cryptographic key held within the server trusted component 1106.

A second option is for usage information to be stored on the client trusted platform 1001, preferably within the client trusted component 1003 (or alternatively held in the protected memory 1009, or secured within the protected memory 1009 or other memory within the client trusted platform 1001 secured by a cryptographic key held within the client trusted component 1003). The trusted server 1109 (preferably the server trusted component 1106) could then interrogate the client trusted platform 1001 as needed to find out usage information—alternatively, the client trusted platform 1001 could report this to the trusted server 1109 at predetermined times or intervals. One approach to this would be for the trusted server 1109 to download an applet to the client trusted platform 1001 to perform reporting back of usage or billing information, or to allow the trusted server 1109 to determine what image data has already been displayed by that user. The trusted server 1109 can act as a clearinghouse, with information relating to billing being sent back, via the downloaded software, to the client trusted platform 1106. Again, it is appropriate for payment to be made by providing user credit card details to the trusted server 1109—these can be held within the client trusted component 1003 (or provided by the user smart card 1008 via the client trusted component 1003) and forwarded to the trusted server 1109 with usage information.

The third option is for usage information to be stored on the user smart card 1008. This had the advantage of measuring use by a specific user, rather than a specific trusted platform, and may therefore be particularly appropriate to a hotdesking environment (or one in which publicly available trusted platforms are provided—as may be the case in libraries or airport lounges). Again, the trusted server 1109 could interrogate the smart card 1008 (via the client trusted platform 1001) to find out usage or account information, or this information could be provided to the trusted server 1109 at regular times or intervals, perhaps by downloading of an applet to the smart card 1008 as described for the second option above.

As indicated above, data usage may be significant for billing purposes as well as for checking data accessed by the user. One situation where this is relevant is where the user is allowed a specific number of accesses to the data (such as in fixed usage licensing models—licensing models appropriate for use for data executed in whole or in part on a trusted computing platform are further discussed in the applicant's copending International Patent Application No. PCT/GB 00/03101 entitled "Computer Platforms and Their Methods of Operation" filed on 11 Aug. 2000 and incorporated by reference herein) or is allowed only limited access for pre-purchase trial. In such arrangements, it may be necessary for the trusted server 1109 to check the log file (wherever stored)

relating to the relevant user or client platform to ensure that permitted use has not been or will not be exceeded. If there is evidence from the log that use has been exceeded (perhaps that there has been a previous trial use of the software concerned), then the trusted server 1109 will cause an error message to be generated and provided to the user on the client trusted platform 1001 (probably by means of the display 1005, indicating for example that multiple trials of the software are not permitted), and the relevant code (if appropriate) will not be executed on the trusted server 1109. This approach allows the full functionality of trial software to be employed by a user in a software trial without risk to the developer of unauthorised use.

In such an arrangement, trial software may for example be provided to be available for a limited time of use on a trusted server 1109, the limited time being set by the developer. The use of the trusted terminal functionality of the client/server arrangement described above ensures that the user (operating the client) cannot copy the software or use it for longer than the allocated period, or contravene any other term of the agreement under which the software is licensed. It can be seen that this arrangement is particularly effective for software trials, but also provides a workable model of use where the developer does not even wish object code to be provided to users, but instead wishes to provide his code for users to access as a pay-per-use service.

Another model possible is for a trial license to be converted to a full license after a number of trial uses. In this case, when the user signs a license agreement, it is agreed that his smart card (or client trusted component) will be provided with a log file (preferably securely held) that indicates that the trial software has been downloaded, and which can be updated by whatever mechanism is appropriate on software use and which can be accessed by the trusted server 1109 when required. For example, before image data is sent to the client, the log file can be checked to see if or how often this trial has been used before, and a decision made by the server as to whether the trial can be continued—when the image data is sent, the log file is updated. After a certain time or number of uses, the user is prompted for payment for continued use of the software, or it may have been agreed as part of the trial agreement that payment be made if a certain number of uses is exceeded (in which case account information is provided then, or earlier, to the trusted server 1109).

As can be seen from the above, arrangements according to the present invention can provide great value in allowing software to be trialled with full functionality or provided on a metered basis, or for content to be provided on a trial or metered basis or accompanied with advertising content, without risk to the software developer or content provider of loss of economic value in their product.

The invention claimed is:

1. A server adapted to provide data to a client platform for restricted use by the client platform, comprising:
   a memory containing image sending code for providing an image of data executed on the server;
   secure communications means for secure communication of images to a client platform; and
   means to authenticate a trusted component of a client platform, the trusted component having a display controller such that display of the data from the server is controlled from within the client trusted component;
   whereby the server is adapted to authenticate the trusted component of a client platform to determine that said client platform is adapted to ensure restricted use of the data before it is sent by the image sending code.

2. A server as claimed in claim 1, containing a server trusted component physically and logically protected from modification, wherein said server trusted component contains the means to authenticate a trusted component.

3. A system for providing image data securely to a user for restricted use, comprising:
   a client platform comprising a display, a processor adapted to allow secure communication with remote parties, a client trusted component physically and logically protected from unauthorised modification to provide verification of the integrity of the platform to a user upon user request, the client trusted component having an associated memory containing image receiving code for receiving data securely from a server and for display of such data and further having a display controller such that the display is controlled from within the client trusted component; and
   a server comprising a memory containing image sending code for providing an image of data executed on the server, a processor adapted to allow secure communication of images to the client platform and to authenticate a trusted component of the client platform;
   wherein the server is adapted to authenticate the trusted component of a client platform to determine that said client platform is adapted to ensure restricted use of the data before it is sent by the image sending code, the client platform is adapted such that the data received from the server is used for display of the data and not for an unauthorised purpose, and the system is adapted for a user on the client platform to request image data from the server to view at the client platform.

4. A system as claimed in claim 3, adapted for a user to request execution of code on the client platform to provide image data to be viewed at the client platform.

5. A system as claimed in claim 3, wherein the client platform comprises a smart card reader for receiving a smart card comprising a user's secure token, further comprising a user smart card wherein the server is adapted to determine that the user smart card is such as to allow the image data to be sent to the client platform.

6. A method of providing image data to a client platform for restricted use, comprising:
   a client platform requesting image data from a server;
   the server determining that the client platform both has permission to receive image data, and has a client trusted component physically and logically protected from unauthorised modification adapted to use the image data only for the restricted use and to control display of the image data from within the client trusted component; and
   provision of the image data over a secure communication channel.

7. A method as claimed in claim 6, further comprising updating of a usage log after image data or modified image data is provided to the client platform.

8. A method as claimed in claim 6, wherein the step of determining permission comprises determining whether a smart card containing a user permission is in session with the client platform.

9. A method as claimed in claim 6, wherein a part of the image data is determined by the server independent of any request from the client platform.

10. A method as claimed in claim 9, wherein said part of the imaging data comprises advertising content.

11. A method as claimed in claim 6, further comprising provision of request data from the client platform to the server, and provision of modified image data based on the request data.

12. A method as claimed in claim 11, wherein the provision of request data and the provision of modified image data are repeated as often as required.

13. A client platform adapted to provide restricted use of data provided by a server, the client platform comprising:
 a display;
 a secure communication means;
 a client trusted component physically and logically protected from unauthorised modification to provide verification of the integrity of the platform to a user upon user request, the client trusted component having an associated memory containing image receiving code for receiving data from a server by the secure communications means and for display of such data, and further having a display controller such that the display is controlled from within the client trusted component;
 wherein the client platform is adapted such that the data received from the server is used for display of the data and not for an unauthorised purpose.

14. A client platform as claimed in claim 13, wherein the client trusted component contains an integrity monitor adapted to provide a measure of the integrity of code operating on the client platform, and the integrity monitor is adapted to monitor the integrity of the image receiving code.

15. A client platform as claimed in claim 13, wherein the client platform further comprises a secure user interface for providing user input directly to the client trusted component, and wherein the image receiving code is adapted to provide user input received from the secure user interface to a server.

16. A client platform as claimed in claim 13, wherein the client trusted component is adapted to authenticate other trusted components or secure tokens.

17. A client platform as claimed in claim 13, wherein the client trusted component is adapted to determine a trusted status of other platforms.

18. A client platform as claimed in claim 13, also comprising a smart card reader for receiving a Smart card comprising a user's secure token.

19. A client platform as claimed in claim 13, wherein a part of the display is reserved for display of data determined by the server independent of any request by the client platform.

20. A system as claimed in claim 13, adapted for a user to request execution of code, and for code then to be executed partly on the client platform and partly on the server to provide image data to be viewed at the client platform, wherein the image data is viewed at the client platform in association with the results of code executed on the client platform.

* * * * *